(12) United States Patent
Kalhan

(10) Patent No.: US 10,721,748 B2
(45) Date of Patent: Jul. 21, 2020

(54) COMMUNICATION RESOURCE SCHEDULING FOR DEVICE-TO-DEVICE (D2D) COMMUNICATION IN AN UNLICENSED FREQUENCY BAND

(71) Applicants: Amit Kalhan, San Diego, CA (US); Kyocera Corporation, Kyoto (JP)

(72) Inventor: Amit Kalhan, San Diego, CA (US)

(73) Assignee: Kyocera Corporation, Kyoto (JP)

(*) Notice: Subject to any disclaimer, the term of this patent is extended or adjusted under 35 U.S.C. 154(b) by 310 days.

(21) Appl. No.: 15/311,768

(22) PCT Filed: May 22, 2015

(86) PCT No.: PCT/US2015/032265
§ 371 (c)(1),
(2) Date: Nov. 16, 2016

(87) PCT Pub. No.: WO2015/179816
PCT Pub. Date: Nov. 26, 2015

(65) Prior Publication Data
US 2017/0118765 A1    Apr. 27, 2017

Related U.S. Application Data

(60) Provisional application No. 62/002,041, filed on May 22, 2014, provisional application No. 62/002,037, filed on May 22, 2014.

(51) Int. Cl.
*H04W 72/12* (2009.01)
*H04W 72/02* (2009.01)
(Continued)

(52) U.S. Cl.
CPC ...... *H04W 72/1215* (2013.01); *H04B 7/2615* (2013.01); *H04L 5/001* (2013.01);
(Continued)

(58) Field of Classification Search
CPC ......... H04W 72/1215; H04W 72/0446; H04W 72/0453; H04W 72/02; H04W 72/1284; H04W 76/023; H04W 24/08
See application file for complete search history.

(56) References Cited

U.S. PATENT DOCUMENTS

| 8,934,909 B2 * | 1/2015 | Koskela | H04W 28/08 370/395.41 |
| 8,977,276 B2 * | 3/2015 | Koskela | H04W 76/14 455/450 |

(Continued)

FOREIGN PATENT DOCUMENTS

| WO | WO 2013-155672 | 10/2013 |
| WO | WO 2013-179095 | 12/2013 |

OTHER PUBLICATIONS

CATT; "Considerations on D2D communication", R1-133030; 3GPP TSG RAN WG1 Meeting #74; Aug. 19-23, 2013; Barcelona, ES.
(Continued)

*Primary Examiner* — Rasheed Gidado

(57) ABSTRACT

A transmitting user equipment (UE) device transmits scheduling assignment information within a scheduling assignment region of a physical channel structure where the physical channel structure is defined by at least one revision of a communication specification governing communication within a licensed frequency band. The scheduling assignment information identifies time-frequency communication resources of an unlicensed frequency band. The transmitting UE device transmits data to a receiving UE device using the time-frequency communication resources of the unlicensed frequency band.

20 Claims, 19 Drawing Sheets

US 10,721,748 B2
Page 2

(51) Int. Cl.

| | | |
|---|---|---|
| *H04W 24/08* | (2009.01) | |
| *H04W 72/04* | (2009.01) | |
| *H04W 76/14* | (2018.01) | |
| *H04W 4/70* | (2018.01) | |
| *H04L 5/00* | (2006.01) | |
| *H04L 27/00* | (2006.01) | |
| *H04W 74/08* | (2009.01) | |
| *H04W 84/12* | (2009.01) | |
| *H04B 7/26* | (2006.01) | |
| *H04W 16/14* | (2009.01) | |
| *H04W 24/10* | (2009.01) | |
| *H04W 72/08* | (2009.01) | |
| *H04W 88/06* | (2009.01) | |
| *H04W 88/08* | (2009.01) | |

(52) U.S. Cl.
CPC ........... *H04L 27/0006* (2013.01); *H04W 4/70* (2018.02); *H04W 16/14* (2013.01); *H04W 24/08* (2013.01); *H04W 24/10* (2013.01); *H04W 72/02* (2013.01); *H04W 72/042* (2013.01); *H04W 72/0413* (2013.01); *H04W 72/0446* (2013.01); *H04W 72/0453* (2013.01); *H04W 72/082* (2013.01); *H04W 72/1284* (2013.01); *H04W 74/0808* (2013.01); *H04W 76/14* (2018.02); *H04W 84/12* (2013.01); *H04L 5/0048* (2013.01); *H04W 74/0866* (2013.01); *H04W 88/06* (2013.01); *H04W 88/08* (2013.01)

(56) References Cited

U.S. PATENT DOCUMENTS

| | | | | |
|---|---|---|---|---|
| 9,253,799 | B2* | 2/2016 | Taori | H04W 74/0808 |
| 9,398,601 | B2* | 7/2016 | Na | H04W 72/121 |
| 2005/0143123 | A1* | 6/2005 | Black | H04B 1/713 |
| | | | | 455/552.1 |
| 2006/0121854 | A1 | 6/2006 | Abhishek et al. | |
| 2008/0298450 | A1 | 12/2008 | Zhang et al. | |
| 2010/0029216 | A1* | 2/2010 | Jovicic | H04B 7/2615 |
| | | | | 455/68 |
| 2010/0246506 | A1 | 9/2010 | Krishnaswamy et al. | |
| 2011/0287794 | A1 | 11/2011 | Koskela et al. | |
| 2011/0312331 | A1 | 12/2011 | Hakola et al. | |
| 2012/0077510 | A1 | 3/2012 | Chen et al. | |
| 2012/0134344 | A1* | 5/2012 | Yu | H04W 72/14 |
| | | | | 370/336 |
| 2012/0307748 | A1* | 12/2012 | Cheng | H04L 5/0005 |
| | | | | 370/329 |
| 2012/0307869 | A1 | 12/2012 | Charbit et al. | |
| 2013/0083783 | A1 | 4/2013 | Gupta et al. | |
| 2013/0143502 | A1 | 6/2013 | Kazmi et al. | |
| 2013/0294356 | A1* | 11/2013 | Bala | H04W 16/14 |
| | | | | 370/329 |
| 2013/0337821 | A1* | 12/2013 | Clegg | H04L 5/0062 |
| | | | | 455/452.1 |
| 2014/0036818 | A1 | 2/2014 | Koskela et al. | |
| 2014/0036853 | A1 | 2/2014 | Kim et al. | |
| 2014/0112289 | A1* | 4/2014 | Kim | H04W 16/14 |
| | | | | 370/329 |
| 2014/0204847 | A1* | 7/2014 | Belleschi | H04W 76/023 |
| | | | | 370/329 |
| 2014/0362780 | A1* | 12/2014 | Malladi | H04W 16/14 |
| | | | | 370/329 |
| 2015/0049732 | A1* | 2/2015 | Xue | H04L 1/1854 |
| | | | | 370/330 |
| 2015/0223244 | A1* | 8/2015 | Tabet | H04W 72/12 |
| | | | | 370/329 |
| 2015/0264702 | A1* | 9/2015 | Yang | H04W 72/0453 |
| | | | | 455/452.1 |
| 2016/0338019 | A1* | 11/2016 | Ratasuk | H04L 5/001 |
| 2017/0013635 | A1* | 1/2017 | Quan | H04W 72/12 |

OTHER PUBLICATIONS

Samsung; "Mode 2 resource allocation for D2D broadcast communication", R1-142111; 3GPP TSG RAN WG1 Meeting #77; May 19-23, 2014; Seoul, KR.

Samsung; "Mode 1 resource allocation for D2D broadcast communication", R1-142112; 3GPP TSG RAN WG1 Meeting #77; May 19-23, 2014; Seoul, KR.

Huawei, Hisilicon, China Unicom; "Radio resource management for 1:M D2D communication", R2-134131; 3GPP TSG RAN WG2 Meeting #84; Nov. 11-15, 2013; San Francisco, US.

Samsung; "Physical Channel Design for Scheduling Assignment"; R1-141851; 3GPP TSG RAN WG1 Meeting #76bis; Mar. 31-Apr. 4, 2014; Shenzhen, China.

Kyocera, "Design Details of Scheduling Assignments"; R1-141459; 3GPP TSG RAN WG1 Meeting #76bis; Mar. 31-Apr. 4, 2014; Shenzhen, China.

Kyocera; "Resource allocation schemes for D2D communication", R2-134311; 3GPP TSG-RAN WG2 #84; Nov. 1, 2013; San Francisco, US.

* cited by examiner

COMMUNICATION RESOURCE SCHEDULING FOR DEVICE-TO-DEVICE (D2D) COMMUNICATION IN AN UNLICENSED FREQUENCY BAND

CLAIM OF PRIORITY

The present application claims priority to Provisional Application No. 62/002,037, entitled "METHODS OF RESERVING RESOURCES ON UNLICENSED BANDS", filed May 22, 2014, and to Provisional Application No. 62/002,041, entitled "METHODS OF COORDINATING LTE TRANSMISSIONS ON UNLICENSED BANDS", filed May 22, 2014, both assigned to the assignee hereof, and hereby expressly incorporated by reference.

RELATED PATENT APPLICATIONS

The present application claims is related to PCT Patent Application No. PCT/US2015/032257, entitled "UNLICENSED FREQUENCY BAND WITH LICENSED FREQUENCY BAND TIMING", PCT Patent Application No. PCT/US2015/032272, entitled "ASSIGNMENT OF COMMUNICATION RESOURCES IN AN UNLICENSED FREQUENCY BAND TO EQUIPMENT OPERATING IN A LICENSED FREQUENCY BAND", and PCT Patent Application No. PCT/US2015/032279, entitled "PHYSICAL CHANNEL STRUCTURE FOR COMMUNICATION IN UNLICENSED FREQUENCY BAND", all filed concurrently with this application, assigned to the assignee hereof, and hereby expressly incorporated by reference.

FIELD

This invention generally relates to wireless communications and more particularly to scheduling communication resources for device-to-device (D2D) communication in an unlicensed frequency band.

BACKGROUND

Many wireless communication systems use base stations to provide geographical service areas where wireless communication user equipment (UE) devices communicate with the base station providing the particular geographical service area in which the wireless communication UE devices are located. The base stations are connected within a network allowing communication links to be made between the wireless communication devices and other devices. In some circumstances, the communication links are between UE devices that are close to each other. In these situations, it may be preferred to have a direct communication link between the two UE devices rather than communicating through a base station. Such direct communication between devices is often referred to as device-to-device (D2D) communication or peer-to-peer (P2P) communication.

The frequency spectrum used by a particular communication may be licensed or unlicensed. Licensed frequency spectrum (frequency band) is licensed to a system operator by a government agency, such as the Federal Communications Commission (FCC). An example of such licensed spectrum includes frequency bands used for cellular communication. An unlicensed frequency band is any portion of frequency spectrum that does not require a license from the government agency to communicate with the unlicensed frequency band. Equipment operating within the unlicensed band, however, typically must adhere to regulations and/or communication standards. An example of unlicensed frequency spectrum includes frequency bands used for Institute of Electrical and Electronics Engineers (IEEE) 802.11 communication.

Communication systems operating in a licensed frequency band typically utilize timing schemes or timing structures for managing communications between devices. Time can be defined in any number of units and subunits where the communication equipment applies the timing to transmission and reception. For example, some systems divide time into at least frames, subframes, timeslots, and symbol times. The physical channel structure used by a system may also involve dividing and organizing the available frequency bandwidth. As a result, a defined physical channel structure typically includes dividing the frequency and time resources into units and subunits to allow efficient management and use of time-frequency communication resources.

SUMMARY

A transmitting user equipment (UE) device transmits scheduling assignment information within a scheduling assignment region of a physical channel structure where the physical channel structure is defined by at least one revision of a communication specification governing communication within a licensed frequency band. The scheduling assignment information identifies time-frequency communication resources of an unlicensed frequency band. The transmitting UE device transmits data to a receiving UE device using the time-frequency communication resources of the unlicensed frequency band.

DETAILED DESCRIPTION

A licensed communication system operating in a licensed frequency band includes at least some device-to-device (D2D) user equipment (UE) devices that are capable of sending at least some signals directly to each other. In addition, at least some of the licensed communication equipment in the licensed communication system also communicates within an unlicensed frequency band. A physical channel structure including a timing structure and frequency structure used in the licensed frequency band is applied to the communication in the unlicensed frequency band. The physical channel structure includes at least some communication resource elements (time-frequency resources) allocated for data and others allocated for control information. The control portion of the channel includes a scheduling assignment region allocated for the transmission of scheduling assignments where a scheduling assignment indicates communication resource information that at least identify the communication resources that are assigned for particular transmissions. For examples discussed herein, scheduling assignments are transmitted within the scheduling assignment region where the scheduling assignments provide unlicensed communication resource information for D2D communication in the unlicensed frequency band. In some examples, the scheduling assignment is transmitted by a transmitting D2D UE device to a receiving D2D UE device within the unlicensed frequency band. In other examples, the scheduling assignment is transmitted by a transmitting D2D UE device to a receiving D2D UE device within the licensed frequency band. In some situations, at least one of the transmitting D2D UE device and the receiving D2D UE device is out-of-coverage (OoC) where the device is not within a service area of any enhanced Node B (eNB) (base station). Also, in some examples discussed below, an eNB and a transmitting D2D UE device send scheduling assignments within the same scheduling assignment region where both scheduling assignments include communication resource information regarding the unlicensed frequency band.

Figure 1:
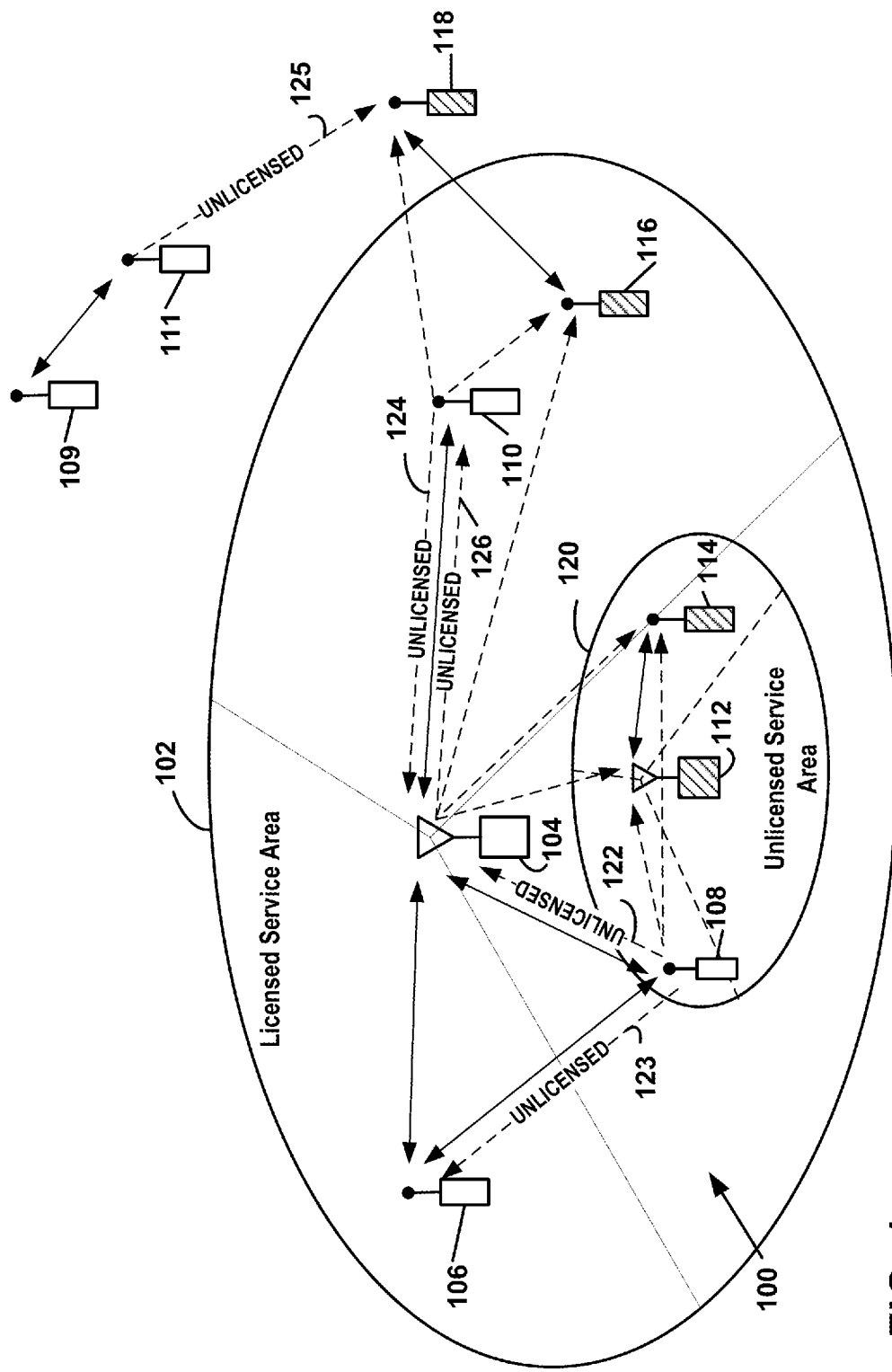
FIG. 1 is a block diagram of a licensed communication system having a licensed service area where communication equipment communicates using an unlicensed frequency band.

FIG. 1 is a block diagram of a licensed communication system 100 having a licensed service area 102 where communication equipment 104, 106, 108, 110 communicates using an unlicensed frequency band. The licensed communication system 100 may be any communication system that uses a portion of frequency spectrum (frequency band) that is licensed to the system operator by a government agency such as the Federal Communications Commission (FCC). For the examples discussed herein, the licensed communication system 100 is a cellular system that operates in accordance with at least one revision of The Third-Generation Partnership Project Long-Term Evolution (3GPP LTE) communication specification. Examples of licensed frequency bands include Advanced Wireless Service (AWS) 4G frequencies in the range of 1,710-1,755 and 2,110-2,155 MHz. The unlicensed frequency band is any portion of frequency spectrum that does not require a license from the government agency to communicate with the unlicensed frequency band. Equipment operating within the unlicensed band, however, typically must adhere to regulations and/or communication standards. Examples of unlicensed bands include frequency bands used for IEEE 802.11 standards that comply with the FCC Rules and Regulations such as WiFi, Bluetooth, and Zigbee. For the example FIG. 1, an eNB 104 provides wireless service to user equipment (UE) devices 106, 108, 110 within a geographical service area (licensed service area) 102 using one or more licensed frequency bands.

A cellular communication system is typically required to adhere to a communication standard or specification. The communication specification defines at least a data channel and a control channel for uplink and downlink transmissions and specifies at least some timing and frequency parameters for physical downlink control channels from a base station to a wireless communication device. The Third-Generation Partnership Project Long-Term Evolution (3GPP LTE) communication specification is a specification for systems where communication stations (eNBs) provide service to wireless communication devices (UE devices) using orthogonal frequency-division multiple access (OFDMA) on the downlink and single-carrier frequency-division multiple access (SC-FDMA) on the uplink. Although the techniques described herein may be applied in other types of communication systems, the exemplary systems discussed herein operate in accordance with an FDD 3GPP LTE communication specification.

The eNB 104 can be any type of communication station or transceiver station or radio head and may be referred to as a base station, eNodeB, fixed station, access point, and other terms. The eNB 104 is typically connected within a network of several other eNBs through a backhaul. The UE devices 106, 108, 109, 110, 111 are any type of user devices and are sometimes referred to by other terms such as, for example, handset, phone, smartphone, mobile device, portable device, and modem. Communication using the licensed band may include downlink transmissions from the eNB to UE devices, uplink communication from UE devices to the eNB, and device-to-device (D2D) communication between two or more UE devices. The bi-directional arrows between the UE devices and the eNB in FIG. 1 represent a connection and/or an association but do not necessarily indicate an ongoing communication session. For example, a UE device may be registered to the eNB and receiving control information but not exchanging data with the eNB.

Other unlicensed devices 112, 114, 116, 118 within the licensed service area 102 use an unlicensed frequency band for communication. The unlicensed devices 112, 114, 116, 118 may include access points 112 providing service to mobile devices 114 and devices 116, 118 operating in device-to-device (D2D) communication scenarios. The unlicensed communications may be ad hoc communication scenarios and may be bidirectional or one-way. Accordingly, the unlicensed devices 112, 114, 116, 118 may include various types of devices and equipment. For the example of FIG. 1, an access point 112 provides wireless service to mobile devices 114 within an unlicensed service area 120 and two other devices 116, 118 communicate directly with each other using the unlicensed frequency band.

For the examples herein, the licensed equipment 104, 106, 108, 109, 110, 111 uses the unlicensed frequency band for communication at times determined to avoid interference, or at least to result in a tolerable level of interference, with communication between unlicensed devices and, in some situations, other licensed devices using the unlicensed frequency band. The unlicensed frequency band is monitored prior to transmission to determine if the band is currently in use. If it is determined that the band is not in use, the licensed equipment transmits signals within the unlicensed frequency band. For the example of FIG. 1, dashed arrows indicate transmissions within the unlicensed band by the licensed system equipment. In some scenarios, UE devices 108, 110, 111 transmit signals 122, 123, 124, 125 to the eNB 104 within the unlicensed frequency band. The signals 122, 123, 124, 125 reach the unlicensed devices that are sufficiently close depending on the power level of the signal. For example, the signal 122 from one UE device 108 may reach the access point 112 and the unlicensed mobile device 114 and the signal 124 from second UE device 110 may reach the unlicensed mobile device 116, 118. Further, the signal 123 may reach the access point 112 and/or the unlicensed mobile device 114. In another scenario, the eNB 104 transmits a signal 126 within the unlicensed frequency band to one or more UE devices 110 and the signal 126 may reach the unlicensed mobile devices 116, 118. The unlicensed mobile device 118 may be outside of the licensed service area 102 in some situations. In some circumstances, two or more UE devices 109, 111 in an out-of-coverage (OoC) scenario may engage in D2D communication using the unlicensed frequency band. For example, a transmitting D2D UE device 111 that is outside all licensed service areas 102 can transmit a signal to a receiving D2D UE device 109 using the unlicensed frequency band. The signal 125 may reach an unlicensed mobile device 118. Since the unlicensed frequency band is monitored for energy prior to transmission by the UE devices 108, 111, interference at the unlicensed devices is reduced. In addition, interference at the licensed devices due to transmission by the unlicensed devices is also reduced.

As discussed herein, "timing structure" and "timing scheme" refer to the divisions and subdivisions in time for managing communication. The "frequency structure" refers to the frequency divisions and arrangement of the channel. The "physical channel structure" refers to the frequency structure as applied to the timing structure to define the channel structure. The time-frequency communication resource of a physical channel, therefore, is divided and organized by the physical channel structure. The physical channel structure divides the frequency resource and the time resource to form a plurality of time-frequency communication resources that are sometimes referred to as communication resource elements. The time-frequency communication resources (resource elements) are allocated for different types of information in the physical channel structure.

The licensed communication system 100 uses a physical channel structure to transmit and receive signals where the physical channel structure divides and organizes time and frequency into an arrangement of units and subunits of time and subcarriers in frequency to form resource elements. For the examples herein, the physical channel structure adheres to at least one revision of the 3GPP LTE standard and includes at least frames, subframes, timeslots, and symbol times for time divisions and subcarriers for frequency divisions. Also, for the examples herein, the timing and the timing structure used for communication by communication equipment in a licensed frequency band are used by the communication equipment to communicate using the unlicensed frequency spectrum. The licensed frequency structure is applied to the unlicensed frequency band such that the number of frequency divisions and subdivisions of the licensed frequency structure are used in the unlicensed frequency structure although the frequencies are different. At least some of the sets of time-frequency resources allocated in the licensed physical channel structure are used in the unlicensed physical channel structure. The timing structure in the examples below includes dividing time into at least frames, subframes and timeslots, and symbol times. As discussed herein "timing" refers to points in time and periods of time. More specifically, using the same timing requires that the boundaries of the smallest division of time in the timing structure be aligned. By applying the timing of the licensed system to the unlicensed frequency band, therefore, communication events are aligned in time. Although the timing structure used in the unlicensed frequency band can be applied such that it is aligned with the timing structure in the licensed frequency, the timing of the licensed system can be applied to communication in the unlicensed frequency band without aligning the timing structure. For example, the timing structure used in the unlicensed frequency band may be offset from the timing structure in the licensed frequency band by some multiple of symbol times. Since the timing used in the licensed frequency band is applied to the unlicensed frequency band, however, the boundaries of the symbol times in the unlicensed frequency band are aligned with the symbol time boundaries in the licensed frequency band. An example of physical channel structure related to licensed and unlicensed communication is discussed in patent application entitled "Physical Channel Structure For Communication In Unlicensed Frequency Band", and filed concurrently with this application. As discussed below, the physical channel structures used in the licensed and unlicensed frequency bands include a scheduling assignment region.

Figure 2:
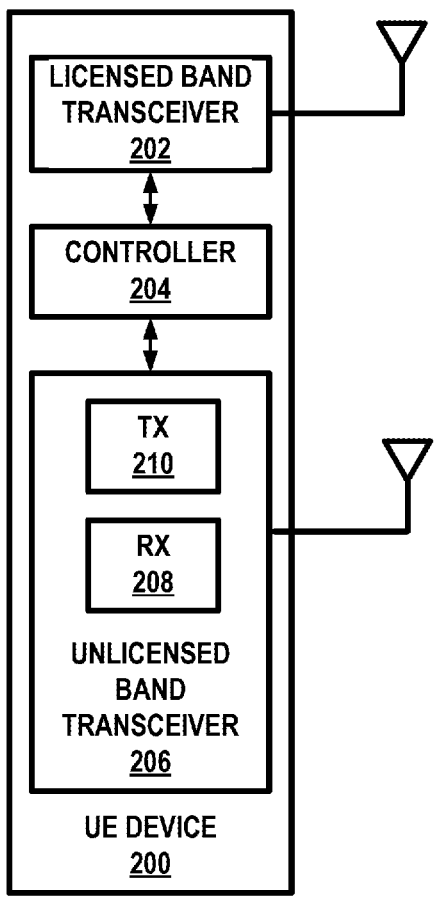
FIG. 2 is a block diagram of an example of a UE device suitable for use as one of the UE devices in FIG. 1.

FIG. 2 is a block diagram of an example of a UE device 200 suitable for use as one of the UE devices 106, 108, 109, 110, 111 in FIG. 1. The UE device 200 includes a licensed band transceiver 202, a controller 204, as well as other components and circuitry (not shown) such as memory, for example. For the examples herein, each UE device also includes an unlicensed band transceiver 206 which includes an unlicensed band receiver 208 and an unlicensed band transmitter 210. The unlicensed band transmitter 210 transmits signals over the unlicensed frequency band where, depending on the situation, the signals may provide uplink control information to the eNB, uplink data information to the eNB, D2D control information to another UE, and/or D2D data information to another UE device. The unlicensed band transmitter 210 may also be used in some situations to transmit a reserve signal in the unlicensed frequency band as discussed below in further detail. The unlicensed band transmitter 210 may be omitted from the UE device 200. This may be the case where the UE device 200 is used to only monitor the unlicensed band and/or only to receive signals within the unlicensed band. The unlicensed band receiver 208 receives signals over the unlicensed frequency band where, depending on the situation, the signals may provide downlink control information from the eNB, downlink data information from the eNB, D2D control information from another UE, and/or D2D data information from another UE device.

The licensed band transceiver 202 includes a transmitter that transmits uplink wireless signals to eNBs and a receiver that receives downlink wireless signals from the eNBs within the licensed frequency band. The transceiver can also be configured to transmit and receive D2D signals using allocated licensed uplink communication resources. The controller 204 controls components of the UE device 200 to manage the functions of the device 200 described herein as well as to facilitate the overall functionality of the device 200. The controller 204 is connected to the transceivers 202, 206 and other components such as memory.

Figure 3:
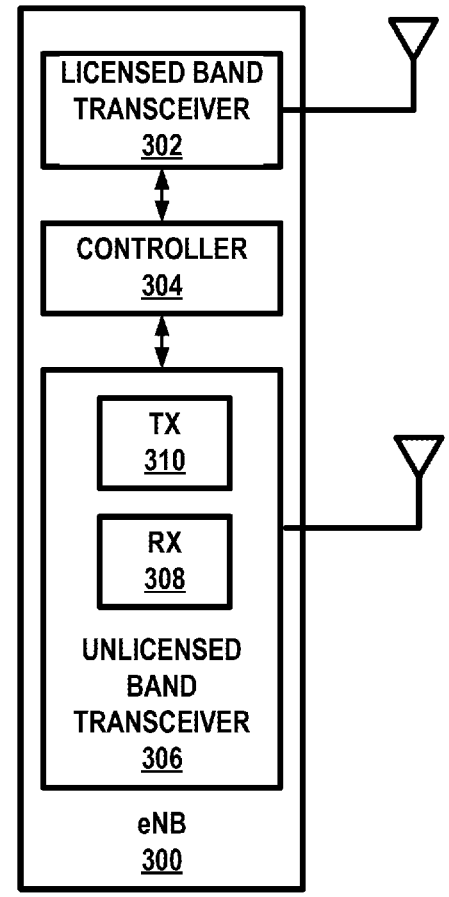
FIG. 3 is a block diagram of an example of an enhanced Node B (eNB) suitable for use as the eNB in FIG. 1.

FIG. 3 is a block diagram of an example of an eNB 300 suitable for use as the eNB 104 in FIG. 1. The eNB 300 includes a licensed band transceiver 302, a controller 304, as well as other components and circuitry (not shown) such as memory, for example. For the examples herein, the eNB also includes an unlicensed band transceiver 306 which includes an unlicensed band receiver 308 and an unlicensed band transmitter 310. The unlicensed band transmitter 310 transmits signals over the unlicensed frequency band where, depending on the situation, the signals may provide downlink control information to the UE device and downlink data information to the UE device. The unlicensed band transmitter 310 may also be used in some situations to transmit a reserve signal in the unlicensed frequency band as discussed below in further detail. The unlicensed band transmitter 310 may be omitted from the eNB 300. This may be the case where the eNB is used to only monitor the unlicensed band and/or only to receive signals within the unlicensed band. The licensed band transceiver 302 exchanges wireless signals with the UE devices 104, 106, 108, 110 within the service area 102. Transmissions within the licensed band from the eNB and from the UE devices are governed by a communication specification that defines signaling, protocols, and parameters of the transmission with the frequency band licensed to the operator of the licensed system 100. The communication specification may provide strict rules for communication and may also provide general requirements where specific implementations may vary while still adhering to the communication specification. Although the discussion herein is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical channels. As discussed below in further detail, at least one of the timing parameters is applied to the unlicensed frequency band.

Figure 4A:
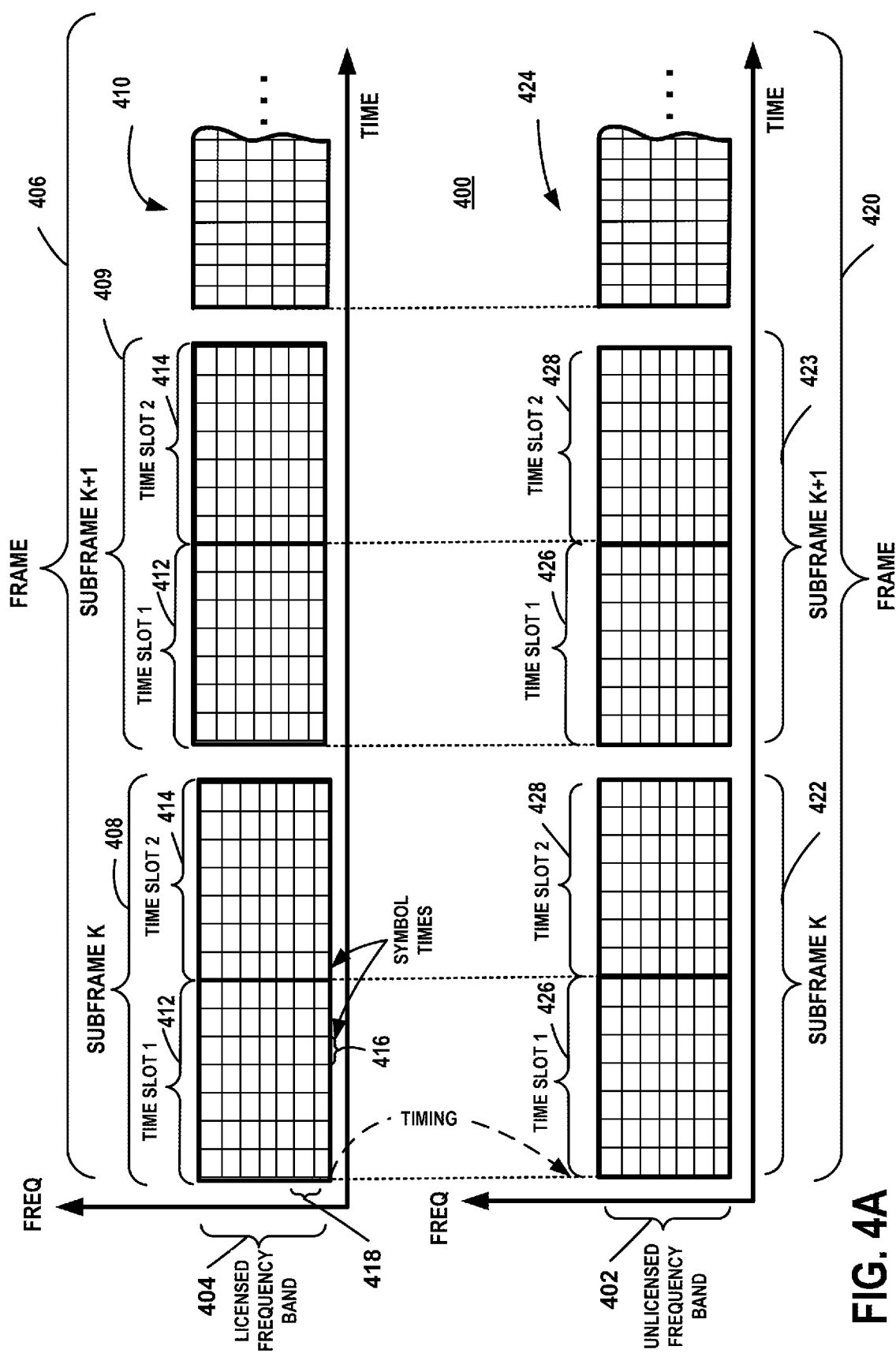
FIG. 4A is an illustration of an unlicensed frequency band and a licensed frequency band where the timing and timing structure used by a licensed system in the licensed frequency band is used for communication in the unlicensed frequency band.
Figure 4B:
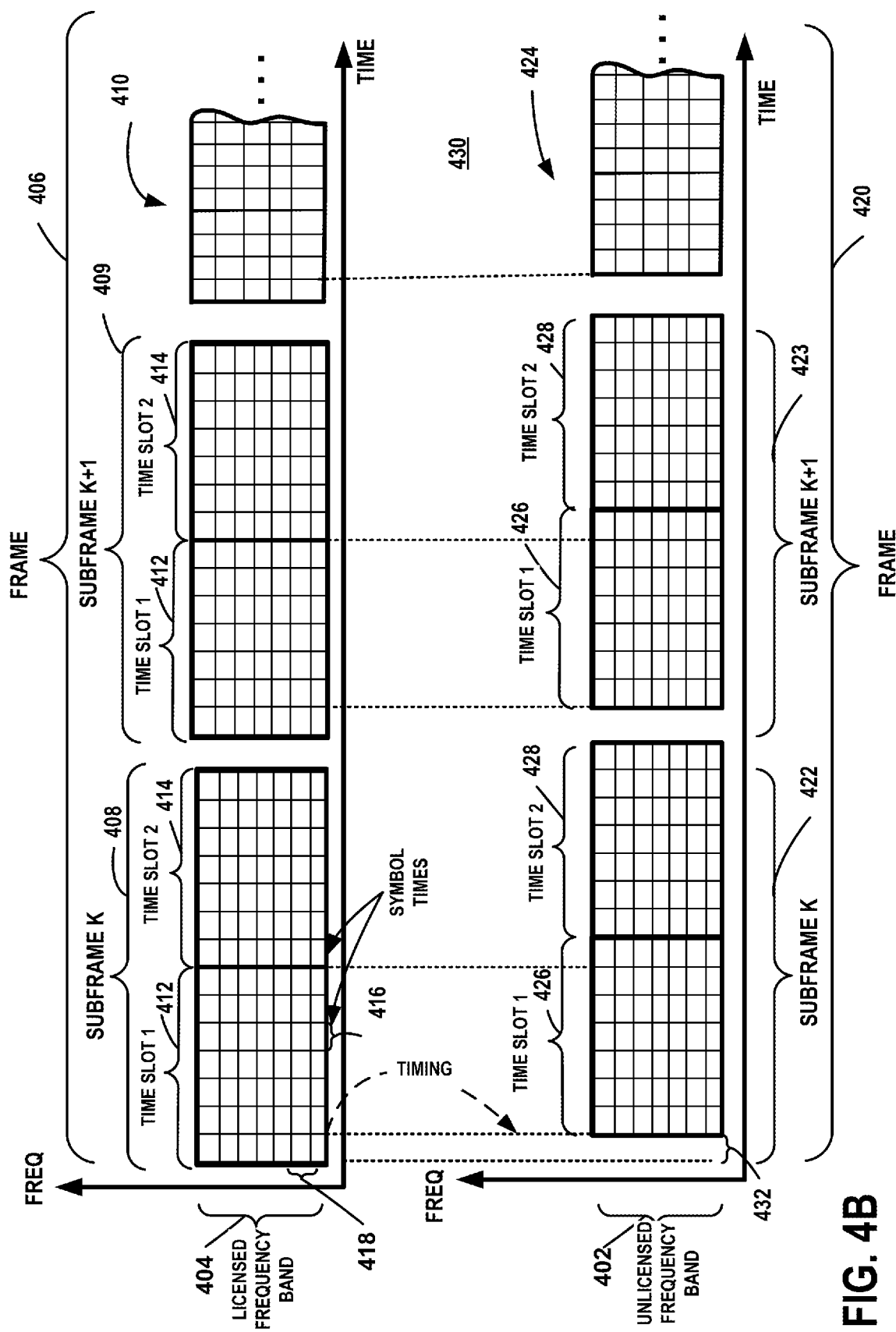
FIG. 4B is an illustration of the unlicensed frequency band and the licensed frequency band where the timing and timing structure used by a licensed system in the licensed frequency band is used for communication in the unlicensed frequency band and the timing structure in the unlicensed frequency band is offset from the timing structure in the licensed frequency band.

FIG. 4A is an illustration of an unlicensed frequency band 402 and a licensed frequency band 404 where the timing and the timing structure used by a licensed system in the licensed frequency band 404 is used for communication in the unlicensed frequency band 402. The illustrations of FIG. 4A and FIG. 4B are frequency-time graphs 400, 430 showing frequency-time resource elements in the licensed frequency band 404 and the timing applied to the unlicensed frequency band. The graphs 400, 430 are not necessarily drawn to scale and only provide exemplary visual representations. The timing used by the licensed system in the licensed frequency band is at least partially based on the communication specification with which the system operates and on the regulations of the frequency band. Time can be organized in numerous ways to establish the timing structure (timing scheme) of the system. For the examples herein, time is at least organized into frames 406, subframes 408, 409, 410, time slots 412, 414, and symbol times 416. For the example, the timing and the timing structure used in the licensed frequency band 404 is in accordance with one or more releases of the 3GPP LTE communication specification.

The frame 406 includes a plurality of subframes including at least a first subframe (K) 408 and a second subframe (K+1) 409. For LTE, each frame includes 10 subframes and each subframe includes 2 time slots. The time slots are further divided into symbol times, where for LTE communication specifications, each time slot includes seven symbol times 416. For LTE, the licensed frequency band 404 is divided into subcarriers 418. The combination of symbol times and subcarriers defines resource elements. Other timing schemes and structures can be used in the licensed frequency band 404.

As discussed above, the licensed equipment uses the unlicensed frequency band 402 for communication where a UE device and/or an eNB transmit signals over the unlicensed frequency band 402 in accordance with the timing used in the licensed frequency band 404. The timing structure used in the licensed system is also applied to the unlicensed frequency band. For the example of FIG. 4A, the licensed system applies the frame, subframe, timeslot and symbol time structure to the unlicensed frequency band 402.

For the example, therefore, the licensed equipment transmits signals within the unlicensed frequency band 402 in accordance with the timing and the timing structure used in the licensed frequency band 404. Accordingly, a frame 420 applied in the unlicensed frequency band corresponds to the frame 406 in the licensed frequency band 402. The subframes 422, 423, 424, timeslots 426, 428, and symbol times applied to the unlicensed frequency band correspond to the subframes 408, 409, 410 timeslots 412, 414, and symbol times 416 in the licensed band. Although FIG. 4A shows the timing structure of the two bands as aligned, in some situations, the timing structure may be offset by some multiple of symbol times, timeslots, subframes, or other timing structure unit.

FIG. 4B is an illustration of an unlicensed frequency band 402 and a licensed frequency band 404 where the timing and the timing structure used by a licensed system in the licensed frequency band 404 is used for communication in the unlicensed frequency band 402 and the timing structure in the unlicensed frequency band is offset from the timing structure in the licensed frequency band. The timing structure in the unlicensed frequency band has an offset 432 from the timing structure in the licensed band. For the example of FIG. 4B, the offset is one symbol time (symbol period). The offset 432 may be any multiple of symbol times. As shown in FIG. 4B, the edges of symbol times are aligned illustrating that the timing of the licensed band is applied in the unlicensed band.

Figure 5:
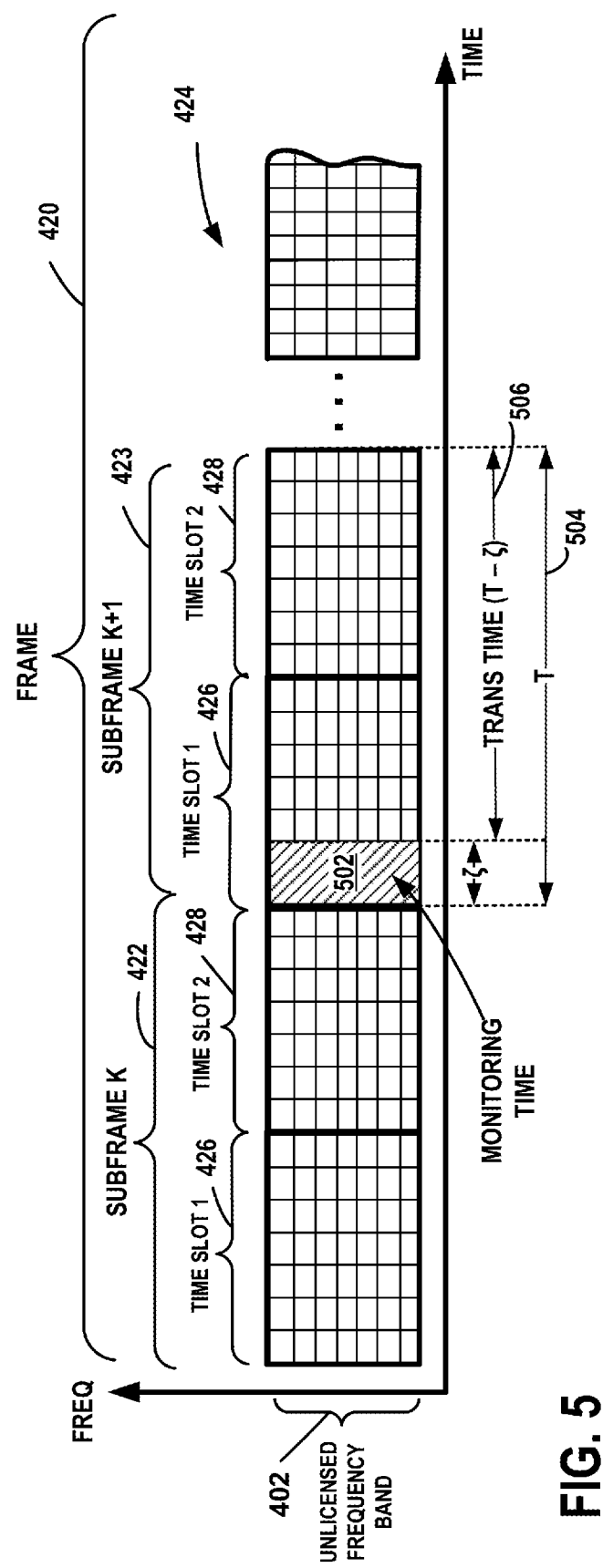
FIG. 5 is a graphical illustration of the unlicensed frequency band for an example where the unlicensed frequency band is monitored within the subframe used for transmission within the unlicensed frequency band.

FIG. 5 is a graphical illustration of the unlicensed frequency band for an example where the unlicensed frequency band is monitored within the subframe used for transmission within the unlicensed frequency band 402. As discussed below, the monitoring may be performed by an eNB or a UE device. For the examples herein, the monitoring, or sensing, of the unlicensed frequency band is performed in accordance with techniques used by the unlicensed equipment using the unlicensed frequency band. For example, if the unlicensed frequency band is the 2.4 GHz band typically used by systems adhering to 802.11 standards, the monitoring is performed by the transmitting device using techniques similar to the techniques used by 802.11 devices. Any of various techniques, however, may be used to "sense", "listen to" or otherwise monitor the unlicensed frequency band. The transmitting devices include electronics for measuring the energy within the unlicensed frequency band and comparing the measured energy to a threshold. If the measured energy exceeds the threshold, the transmitting device determines that the band is in use. In some situations, the energy within the entire unlicensed frequency band is measured. In other situations, only a portion of the spectrum of the unlicensed frequency band is measured. For example, if the transmitting device is determining whether other licensed devices are using the unlicensed frequency band, the transmitting device may look at specific subcarriers where energy will be present if a licensed device is using the frequency band. Such subcarriers may be used for transmitting reference signals, for example.

The monitoring device (eNB or UE device), therefore, determines if the unlicensed frequency band is in use. The monitoring device, for example, may compare a measured energy level to a threshold and determine that the frequency band is not in use if the measured level is below the threshold. The duration ($\zeta$) of the monitoring time 502 is selected to provide sufficient time for measuring the energy level in the band or at least detecting energy in the band. An example of a suitable monitoring time duration is on the order of 0.1~0.5 ms or about 2~10% of the total data transmit burst duration. In some situations, the duration is a multiple of symbol duration. For example, the duration, $\zeta=0.5\times$ symbol time where the symbol time is about 71.8 microseconds in LTE. Where the monitoring time ($\zeta$) 502 is within the subframe that will be used for communication, however, the monitoring time ($\zeta$) should be minimized in order to maximize the time available for communication. For the example of FIG. 5, the period of a subframe is represented by "T". Accordingly, the time available for communication (transmission time) is T-$\zeta$.

Figure 6:
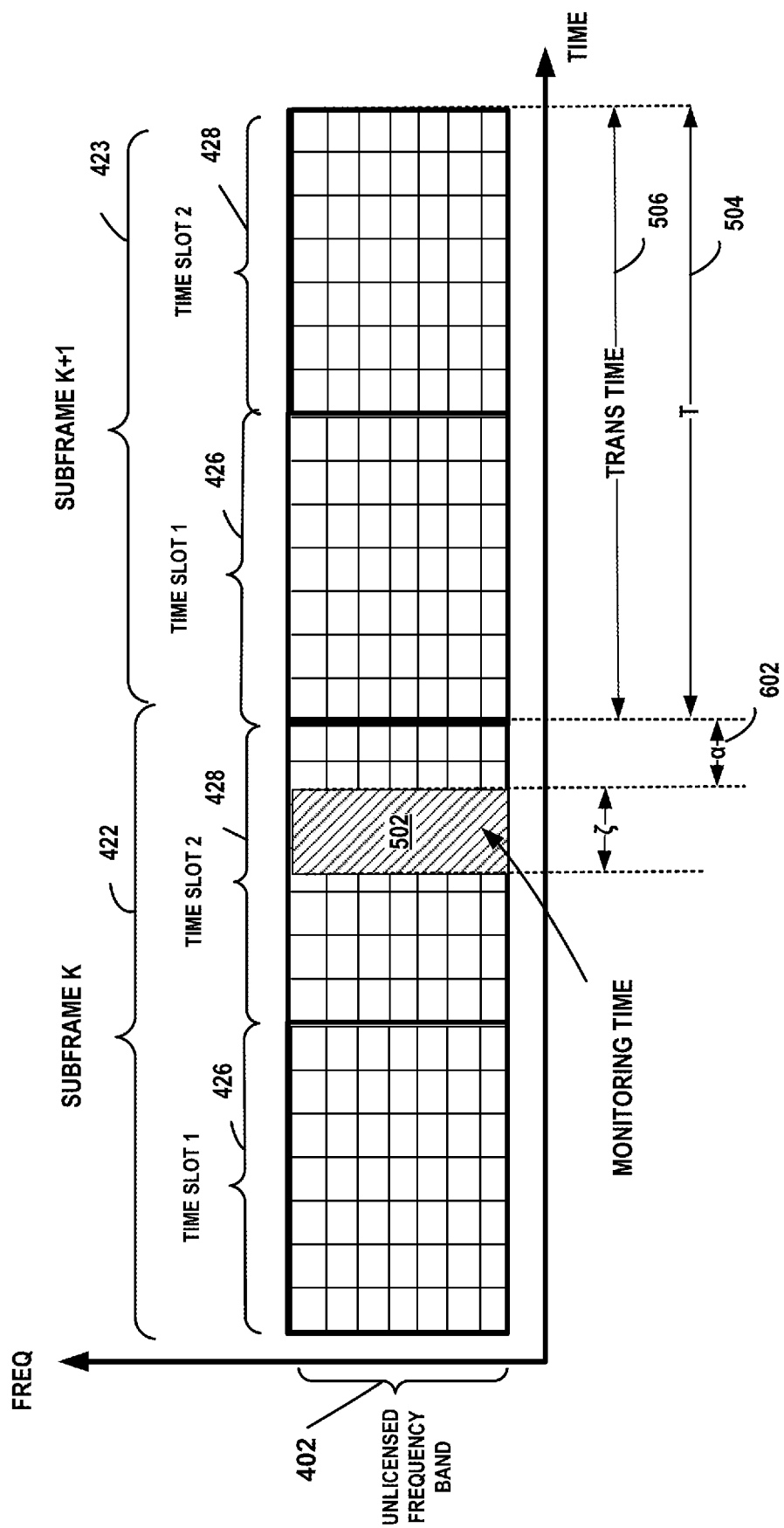
FIG. 6 is a graphical illustration of the unlicensed frequency band for an example where the unlicensed frequency band is monitored within a previous subframe to the subframe used for transmission within the unlicensed frequency band.

FIG. 6 is a graphical illustration of the unlicensed frequency band for an example where the unlicensed frequency band 402 is monitored within a previous subframe 422 to the subframe 423 used for transmission within the unlicensed frequency band 402. For the example of FIG. 6, the unlicensed frequency band is monitored (sensed) during the monitoring time 502 in subframe K 422 at an offset ($\alpha$) 602 from the start of subframe K+1 423. The offset is greater than or equal to zero ($\alpha \le 0$ where $\alpha=0$ at the boundary between K and K+1). The subframe K ends and the subframe K+1 starts when the offset is equal to zero ($\alpha=0$). Since the monitoring is performed in the previous subframe, the entire subframe K+1 423 is available for transmission. Therefore, in some situations, the transmission time 506 is equal to subframe period (T) 504.

The monitoring time duration ($\zeta$) 502 is selected to provide sufficient time for measuring the energy level in the band or at least detecting energy in the band. The offset ($\alpha$) 602 from the start of transmission subframe K+1 423 is selected to be short enough to minimize the likelihood of interference.

For the examples herein, transmission by licensed communication equipment (either an eNB or UE device) within the unlicensed frequency band is preceded by a monitoring period. Therefore, the eNB monitors the unlicensed frequency band before transmitting a scheduling assignment in the unlicensed band. Although the devices typically monitor the unlicensed frequency band before transmitting data in a subframe, in some situations, monitoring may be omitted for some subframes. For example, monitoring may be performed for the first subframe and omitted for subsequent subframes where data is transmitted over a series of consecutive, adjacent subframes.

Figure 7A:
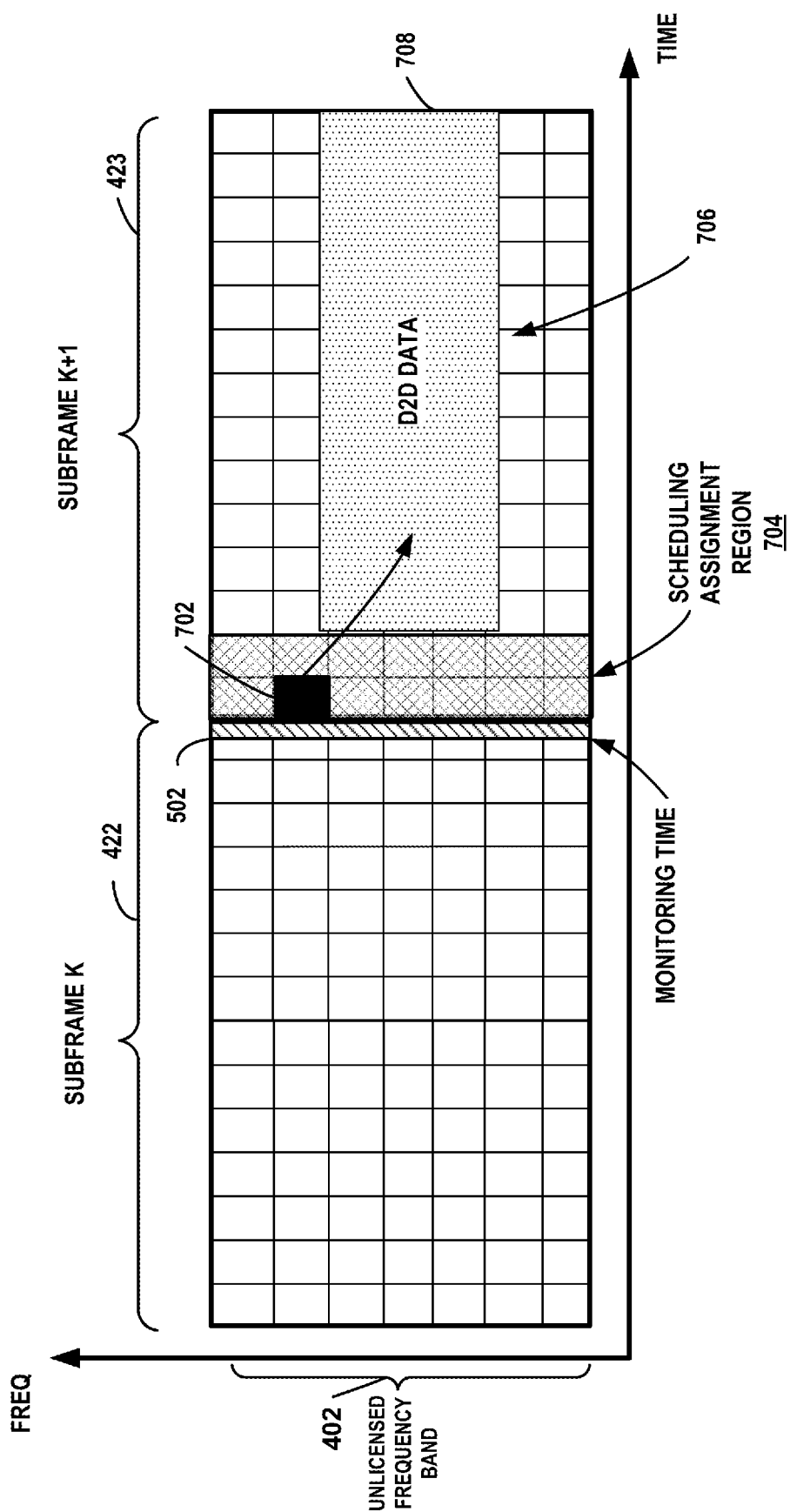
FIG. 7A is a graphical illustration of an example where a transmitting UE device transmits a scheduling assignment within the scheduling assignment region of a subframe in the unlicensed frequency band.
Figure 7B:
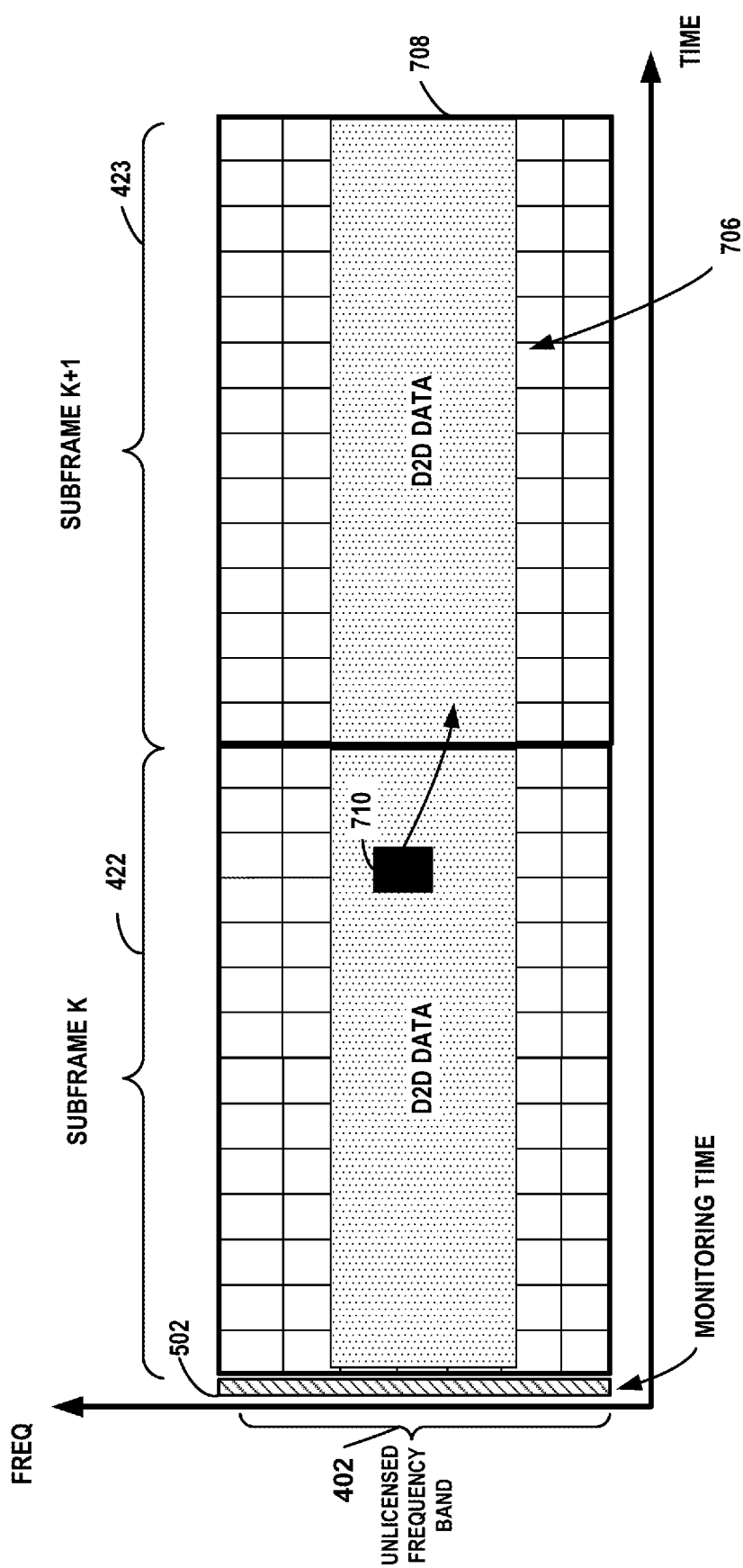
FIG. 7B is a graphical illustration of an example where a transmitting UE device transmits a communication resource information within a data region of a subframe in the unlicensed frequency band.
Figure 7C:
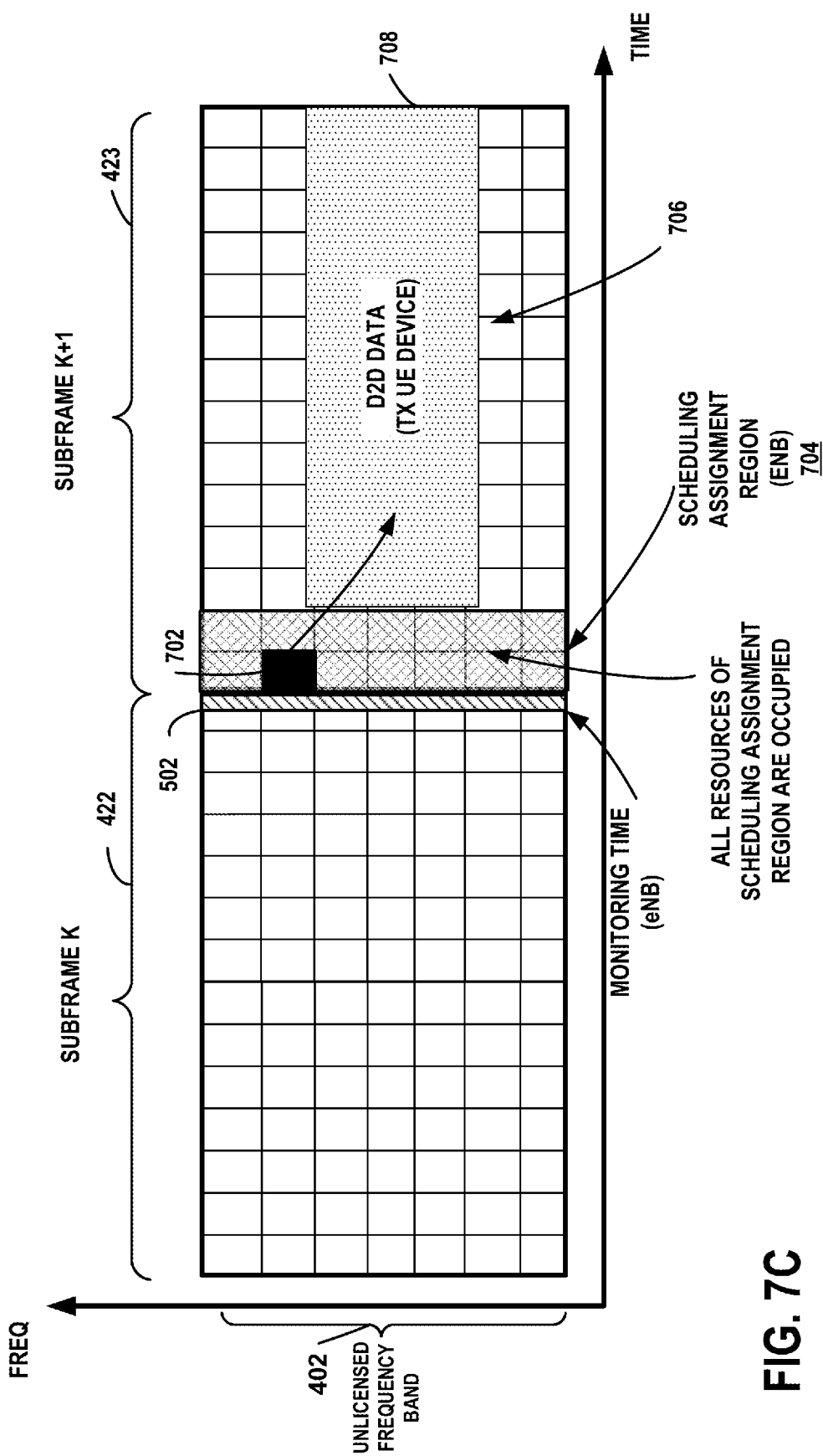
FIG. 7C is a graphical illustration of an example where the eNB transmits a scheduling assignment within a scheduling assignment region of a subframe in the unlicensed frequency band.

FIG. 7A is a graphical illustration of an example where a transmitting UE device transmits a scheduling assignment 702 within scheduling assignment region 704 of a subframe in the unlicensed frequency band 402. The example of FIG. 7 is performed in situations where it has been determined that there are no other nearby devices using the unlicensed band. Techniques of making such determinations are discussed in U.S. patent application Ser. No. 15/311,782, entitled "ASSIGNMENT OF COMMUNICATION RESOURCES IN AN UNLICENSED FREQUENCY BAND TO EQUIPMENT OPERATING IN A LICENSED FREQUENCY BAND", and filed concurrently with this application. In situations where it has not been verified that no other devices are using unlicensed frequency band, the UE device should not transmit the scheduling assignment in a scheduling assignment region. Since a UE device cannot transmit in all communication resources within the scheduling assignment region, scheduling assignment transmission within the scheduling assignment region may not be detected by other devices operating in the unlicensed frequency band. As a result, the devices may erroneously determine that the band is not in use and will begin transmitting likely causing interference with the UE device transmission. Techniques for providing the D2D communication resource information to the receiving D2D UE device when other devices are using the unlicensed frequency band are discussed below with reference to FIG. 7B, FIG. 7C, and FIG. 10B.

The scheduling assignment 702 provides communication resource information that at least identifies communication resources 706 that are assigned for D2D data 708 transmission from the transmitting UE device. In some situations, the scheduling assignment 702 explicitly identifies the communication resource information by including data that is indicative of the data communication resources 706. In other situations, the scheduling assignment 702 identifies the communication resources by the location of the scheduling assignment 702 within the scheduling assignment region 704. For example, resource elements or groups of resource elements can be mapped to a set of communication resources 706. In addition, the scheduling assignment 702 may identify a set of communication resources in a single subframe or multiple sets of resources in multiple subframes.

Typically, the scheduling assignment region is pre-defined in the system. For example, the first 3 symbols within a subframe are may be allocated and defined as the scheduling assignment region. In another example, the entire subframe K is considered the scheduling assignment region where the data is transmitted in subframe K+A and where A>=1.

In some situations, the eNB assigns specific resources within the scheduling assignment region 704 for transmission of the scheduling assignment 702. In other circumstances, the transmitting UE device autonomously selects the specific resource elements within the scheduling assignment region 704 for transmitting the scheduling assignment 702.

Since no other devices are using the unlicensed frequency band for the example of FIG. 7A, there is no need to monitor the unlicensed frequency band before transmission. As discussed below, however, band monitoring is employed where other devices are using the unlicensed frequency band.

FIG. 7B is a graphical illustration of an example where a transmitting UE device transmits a communication resource information within a data region of a subframe in the unlicensed frequency band 402. The example of FIG. 7B is performed in situations where it has been determined that other nearby devices are using the unlicensed band and when it is unknown whether the unlicensed frequency band is in use by other devices. For the example of FIG. 7B, D2D communication resource information 710 is transmitted to the receiving UE devices 109 within a data region 712 of a subframe 422 of the unlicensed frequency band. The communication resource information 710 at least identifies communication resources 706 that are assigned for D2D data 708 transmission from the transmitting UE device. The communication resource information 710 may identify a set of communication resources in a single subframe or multiple sets of resources in multiple subframes. For the example, the communication resource information 712 identifies resource elements for D2D communication in the next subframe 423.

For the example, the UE device 108 monitors the unlicensed frequency band during the monitoring time 502 prior to transmission of the data 712. The UE device 108 observes the unlicensed frequency band to determine whether other nearby devices are currently transmitting signals within the unlicensed frequency band. If the UE device determines the unlicensed frequency band 402 is not in use, the UE device transmits the communication resource information 710 and data 712. Otherwise, it does not transmit the scheduling assignment at that time and continues monitoring the unlicensed frequency band.

FIG. 7C is a graphical illustration of an example where the eNB transmits a scheduling assignment 702 within a scheduling assignment region 704 of a subframe in the unlicensed frequency band 402. The example of FIG. 7C is performed in situations where it has been determined that other nearby devices are using the unlicensed band and when it is unknown whether the unlicensed frequency band is in use by other devices.

As discussed above, the scheduling assignment 702 provides communication resource information that at least identifies communication resources 706 that are assigned for D2D data 708 transmission from the transmitting UE device. In some situations, the scheduling assignment 702 explicitly identifies the communication resource information by including data that is indicative of the data communication resources 706. In other situations, the scheduling assignment 702 identifies the communication resources by the location of the scheduling assignment 702 within the scheduling assignment region 704. For example, resource elements or groups of resource elements can be mapped to a set of communication resources 706. In addition, the scheduling assignment 702 may identify a set of communication resources in a single subframe or multiple sets of resources in multiple subframes.

The eNB transmits other information in addition to the scheduling assignment 702 for the transmitting UE device 108 within the scheduling assignment region 704 such that all the resources of the region 704 are occupied. For the example, the eNB transmits scheduling assignments for multiple UE devices within the scheduling assignment region 704. Filler data is added in situations where the scheduling assignments do not completely fill the region. As a result, any device sensing the unlicensed band during scheduling assignment region will detect energy and refrain from transmission.

For the example, the eNB monitors the unlicensed frequency band during the monitoring time 502 prior to transmission of the scheduling assignment 702. The eNB observes the unlicensed frequency band to determine whether other nearby devices are currently transmitting signals within the unlicensed frequency band. If the eNB determines the unlicensed frequency band 402 is not in use, the eNB transmits the communication resource information in the scheduling assignment. If the eNB determines the unlicensed frequency band 402 is in use, it does not transmit the scheduling assignment at that time and monitors the unlicensed frequency band prior to the next scheduling assignment region. For the example of FIG. 7C, the monitoring time 502 is within the subframe 422 prior to the subframe 423 where the scheduling assignment is to be transmitted. As discussed above, the monitoring time 502 can be within the same subframe as the transmission in some situations. Since the eNB is transmitting within the unlicensed frequency band prior to the transmission of D2D data 708 by the UE device 108, the UE device 108 need not monitor the unlicensed frequency band before transmission. Nearby devices will detect the eNB transmission of the scheduling assignment and will refrain from transmitting within the unlicensed frequency band.

Figure 8:
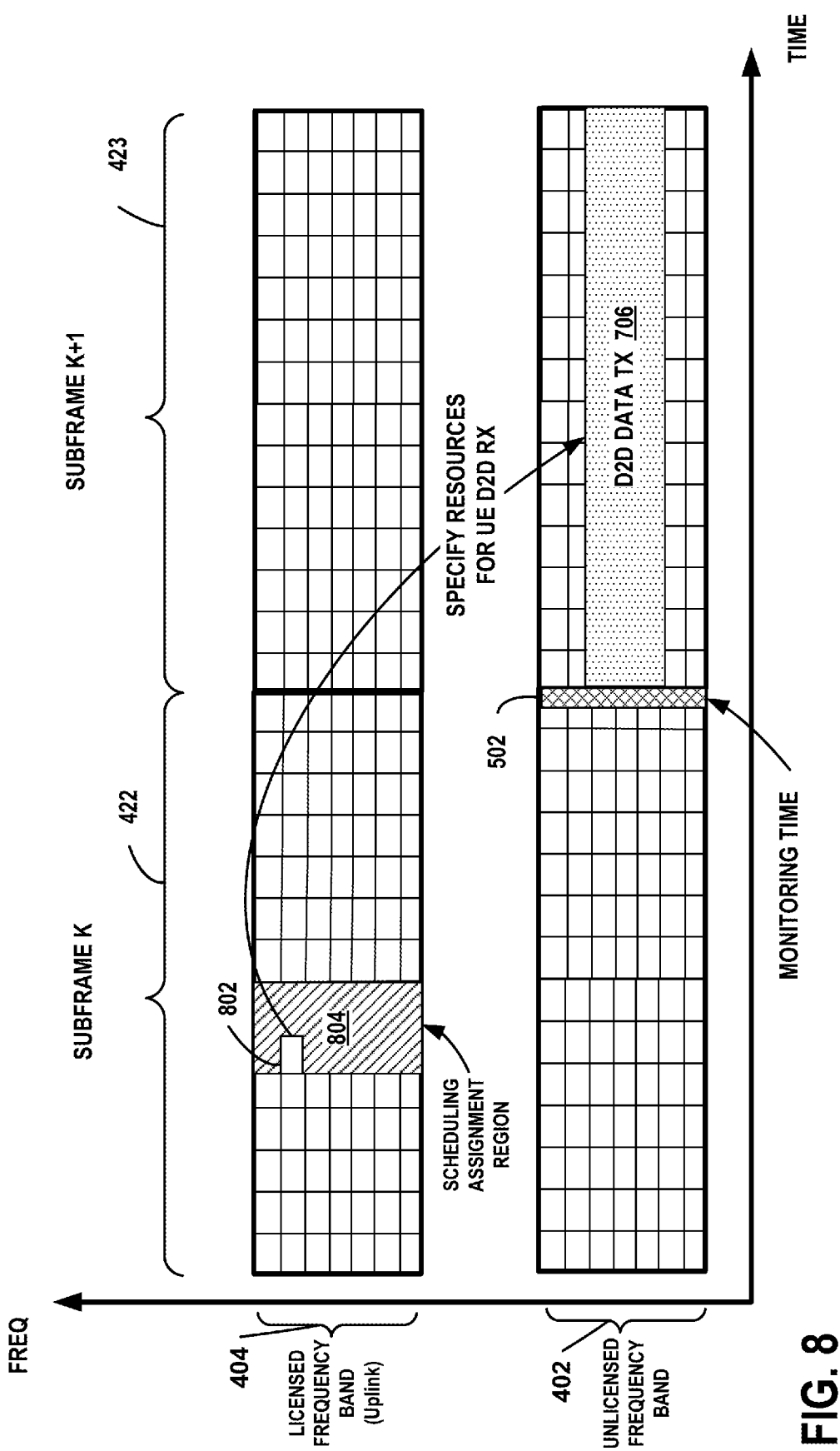
FIG. 8 is a graphical illustration of an example where a transmitting UE device transmits a scheduling assignment within a scheduling assignment region of a subframe in the licensed frequency band.

FIG. 8 is a graphical illustration of an example where a transmitting UE device transmits a scheduling assignment 802 within a scheduling assignment region 804 of a subframe in the licensed frequency band 404. Although the scheduling assignment 802 can be transmitted within the licensed frequency band for full coverage and partial coverage scenarios in some situations, the example of FIG. 8 is discussed with reference to an out-of-coverage scenario where the transmitting D2D UE device and the receiving D2D UE device are both outside the service areas of all eNBs.

The scheduling assignment 802 provides scheduling assignment information that at least identifies communication resources 706 that are assigned for D2D data 708 transmission from the transmitting UE device. In some situations, the scheduling assignment 802 explicitly identifies the communication resources 706 by including data that is indicative of the data communication resources 706. In other situations, the scheduling assignment 802 identifies the communication resources by the location of the scheduling assignment 802 within the scheduling assignment region 804. For example, resource elements or groups of resource elements can be mapped to a set of communication resources 706. In addition, the scheduling assignment 802 may identify a set of communication resources in a single subframe or multiple sets of resources in multiple subframes.

The scheduling assignment 802 is transmitted within the uplink channel in the example of FIG. 8. Such a scheme is consistent with at least one revision of the 3GPP LTE communication specification. In some situations, however, the scheduling assignment can be transmitted within the downlink channel of the licensed frequency band 404.

Since the scheduling assignment is transmitted over the licensed frequency band for the example of FIG. 8, there is no need to monitor the unlicensed or licensed frequency band before transmission of the scheduling assignment 802. The transmitting UE device, however, monitors the unlicensed frequency band prior to transmission of the D2D data 708. The monitoring time 502 can be within the same subframe 423 as the data 706 or in the prior subframe 422.

In some situations where the unlicensed frequency band 402 is busy and the UE device 111 does not transmit the data 706, the UE device may need to transmit another scheduling assignment 802. In other circumstances, the scheduling assignment may be valid for more than one subframe and a transmission may be attempted in a subsequent subframe. For such circumstances, the scheduling assignment may be valid for fixed time, a fixed number of subframes, or for a fixed number of scheduling assignment transmission attempts.

Figure 9:
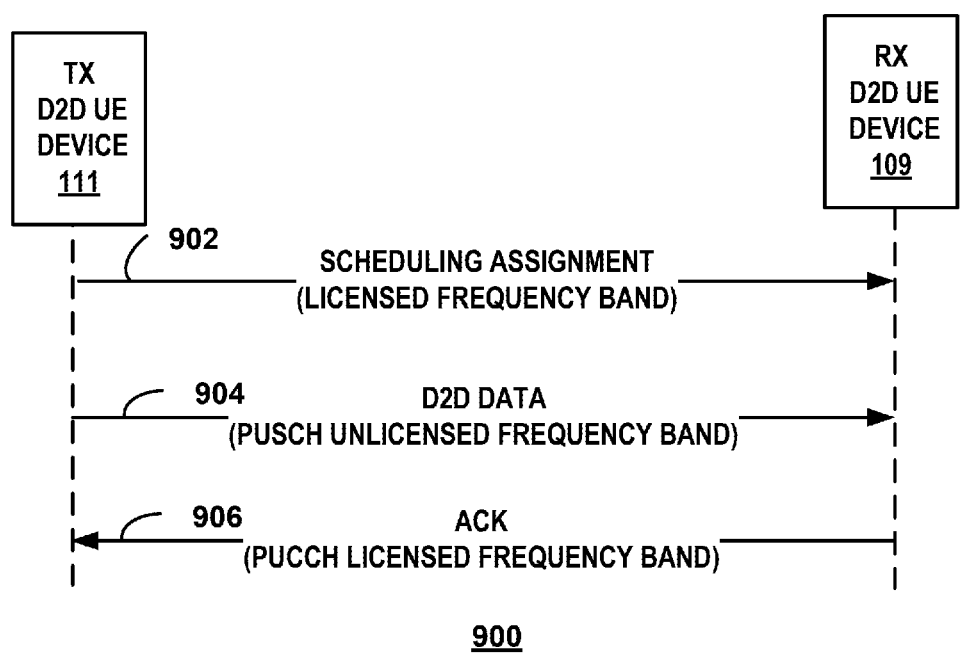
FIG. 9 is a message diagram for an example of D2D communication over the unlicensed frequency band where the transmitting D2D UE device and the receiving D2D UE device are out of coverage.

FIG. 9 is message diagram for an example of D2D communication over the unlicensed frequency band where the transmitting D2D UE device 111 and the receiving D2D UE device 109 are out of coverage.

At event 902, the transmitting D2D UE device 111 sends a scheduling assignment 802 to the receiving D2D UE device over the licensed frequency band. The scheduling assignment 802 is transmitted within the scheduling assignment region 804 using the uplink channel and includes communication resource information identifying the resource elements in the unlicensed frequency band where D2D data will be transmitted. As discussed above, the location of the scheduling assignment 802 within the scheduling assignment region 804 may identify the D2D communication resources in some circumstances.

At event 904, the D2D data is transmitted from the transmitting D2D UE device 111 to the receiving D2D UE device 109 using the resources in the unlicensed frequency band identified by the scheduling assignment 802. For the example, the communication resources are transmitted in the PUSCH of the physical channel structure in the unlicensed frequency band.

At event 906, the receiving D2D UE device 109 responds to the PUSCH data message with an acknowledgment in the PUCCH within the licensed uplink physical channel structure in the licensed frequency band. In some situations, the acknowledgment is omitted.

Figure 10A:
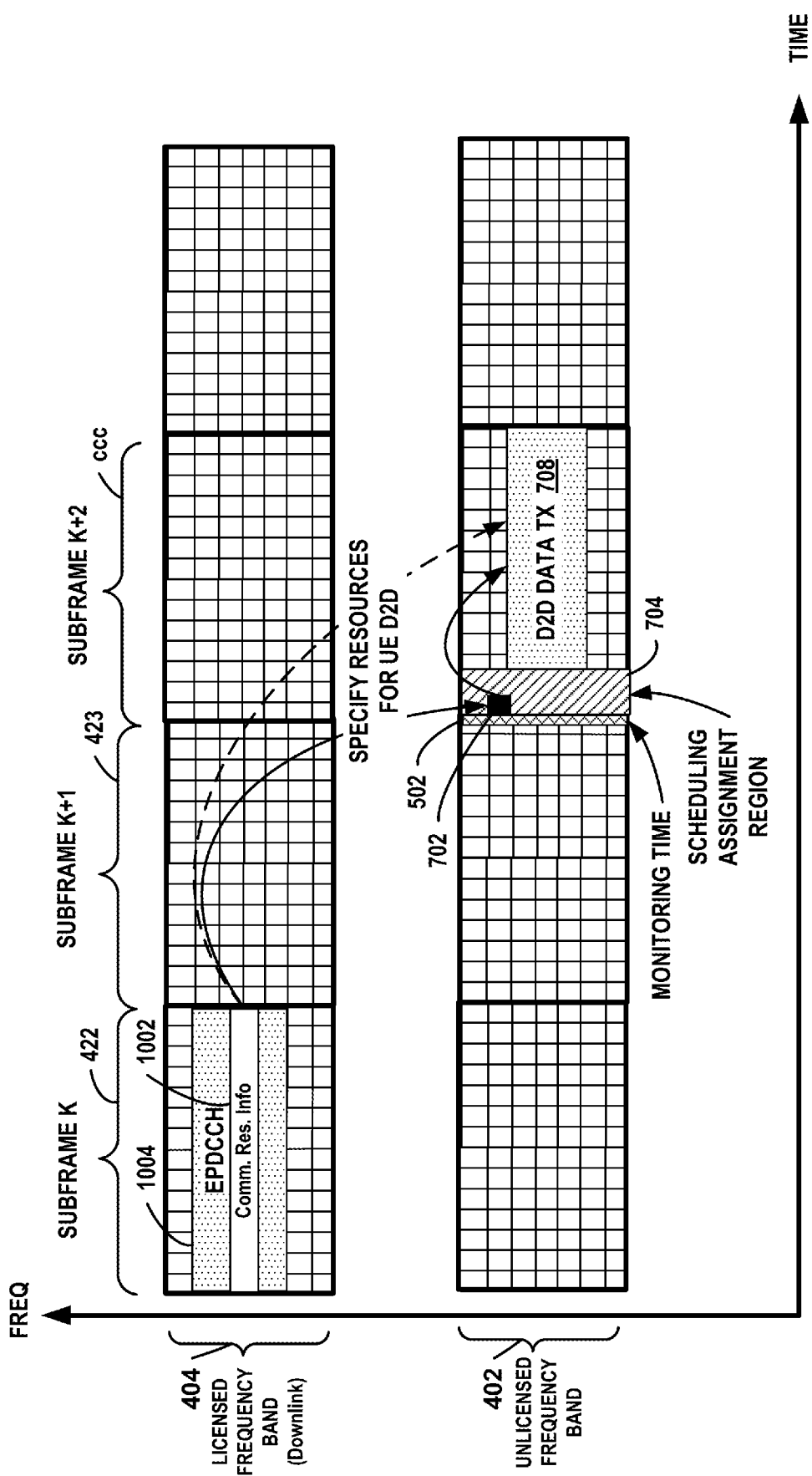
FIG. 10A is a graphical illustration of an example where an eNB transmits D2D communication resource information to the transmitting D2D UE device identifying D2D communication resources and the transmitting D2D UE device transmits a scheduling assignment within a scheduling assignment region of a subframe in the unlicensed frequency band.

FIG. 10A is a graphical illustration of an example where an eNB transmits D2D communication resource information 1002 to the transmitting D2D UE device identifying D2D communication resources and the transmitting D2D UE device transmits a scheduling assignment 702 within a scheduling assignment region 704 of a subframe in the unlicensed frequency band 402. Accordingly, the scenario of FIG. 10A is a further example of the technique discussed with reference to FIG. 7A where it has been determined that no nearby devices are using the unlicensed frequency band.

For the example, the eNB transmits D2D communication resource information 1002 over the enhanced physical downlink control channel (EPDCCH) 1004. The D2D communication resource information 1002, however, may be conveyed to the transmitting D2D UE device in other ways. The information 1002 can be transmitted over the PDCCH or PDSCH, for example. In addition to using dedicated signaling, the eNB can broadcast the information 1002 in some circumstances. In one example, the information 1002 is broadcasted on a downlink physical channel in the licensed frequency band 404. Such a broadcast message may be sent in a system information block (SIB). In another example, the information 1002 is broadcasted in the unlicensed frequency band 402.

The transmitting D2D UE device 108 receives the D2D communication resource information 1002 and, based on the information 1002, transmits a scheduling assignment 702 to convey the information 1002 to the receiving D2D UE device 106. The scheduling assignment 702 provides the scheduling assignment information that at least identifies communication resources 706 that are assigned for D2D data 708 transmission from the transmitting UE device. In some situations, as discussed above, the scheduling assignment 702 explicitly identifies the communication resource information by including data that is indicative of the data communication resources 706. In other situations, the scheduling assignment 702 identifies the communication resources by the location of the scheduling assignment 702 within the scheduling assignment region 704.

In some circumstances, the D2D communication resource information 1002 transmitted by eNB 104 identifies specific resources that are to be used by the UE devices 106, 108. In these circumstances, the scheduling assignment 702 directly reflects the D2D communication resource information 1002. In other situations, the eNB may identify a pool of resources that can be used for D2D communication and the transmitting UE device 108 determines which of those resources should specifically be used for the D2D communication between the two UE devices 106, 108. In these situations, the scheduling assignment information conveyed by the scheduling assignment 702 may be a subset of the information 1002 provided by the eNB. The transmitting D2D UE device 108 monitors the unlicensed frequency band for the monitoring time 502 before transmitting the scheduling assignment 702 within the scheduling assignment region 704.

Figure 10B:
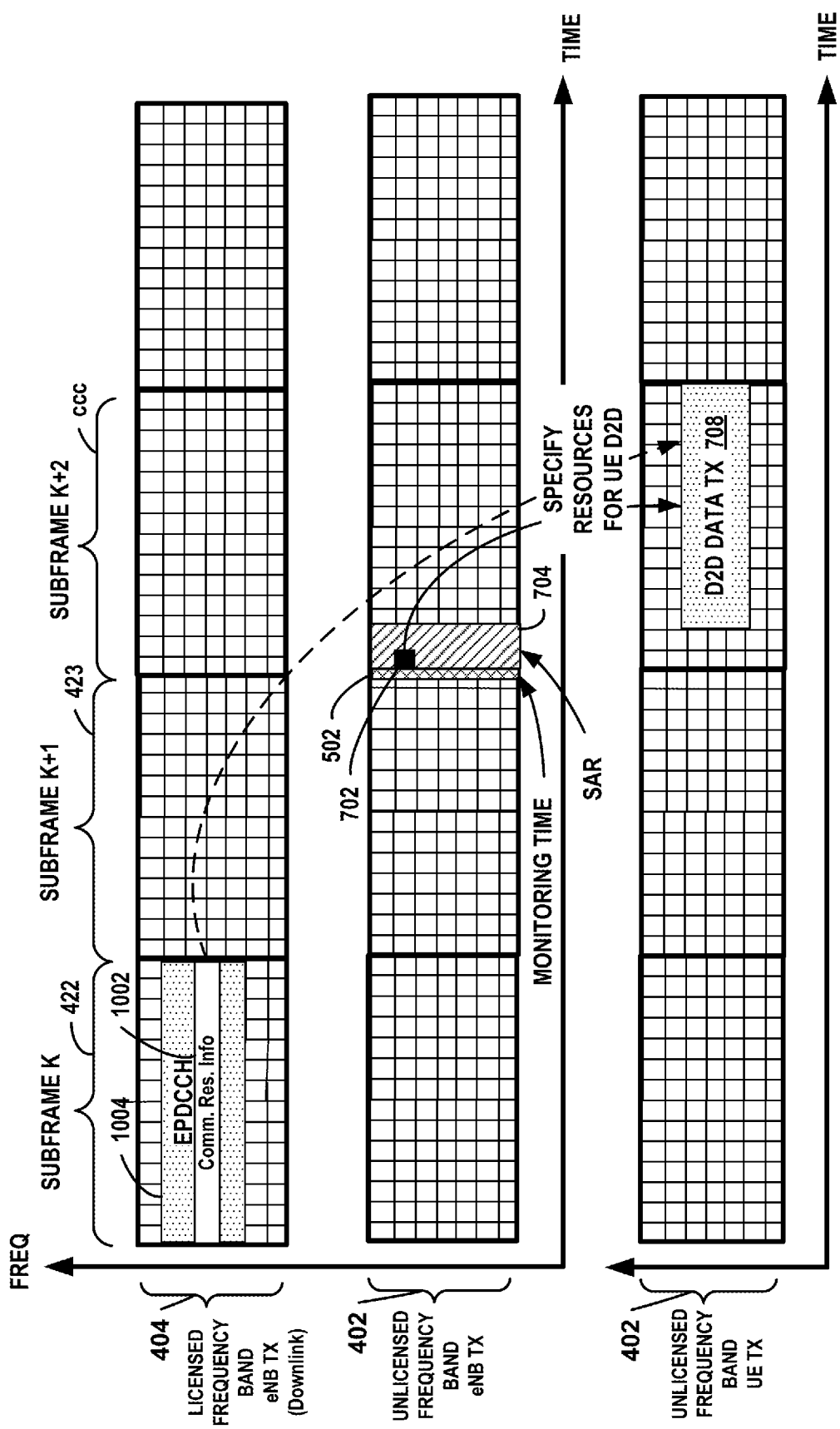
FIG. 10B is a graphical illustration of an example where an eNB transmits D2D communication resource information to the transmitting D2D UE device identifying D2D communication resources and transmits a scheduling assignment within a scheduling assignment region of a subframe in the unlicensed frequency band.

FIG. 10B is a graphical illustration of an example where an eNB transmits D2D communication resource information 1002 to the transmitting D2D UE device identifying D2D communication resources and transmits a scheduling assignment 702 within a scheduling assignment region 704 of a subframe in the unlicensed frequency band 402. Accordingly, the scenario of FIG. 10B is a further example of the technique discussed with reference to FIG. 7C.

For the example, the eNB transmits D2D communication resource information 1002 over the enhanced physical downlink control channel (EPDCCH) 1004. The D2D communication resource information 1002, however, may be conveyed to the transmitting D2D UE device in other ways. The information 1002 can be transmitted over the PDCCH or PDSCH, for example. In addition to using dedicated signaling, the eNB can broadcast the information 1002 in some circumstances. In one example, the information 1002 is broadcasted on a downlink physical channel in the licensed frequency band 404. Such a broadcast message may be sent in a system information block (SIB). In another example, the information 1002 is broadcasted in the unlicensed frequency band 402.

Figure 11A:
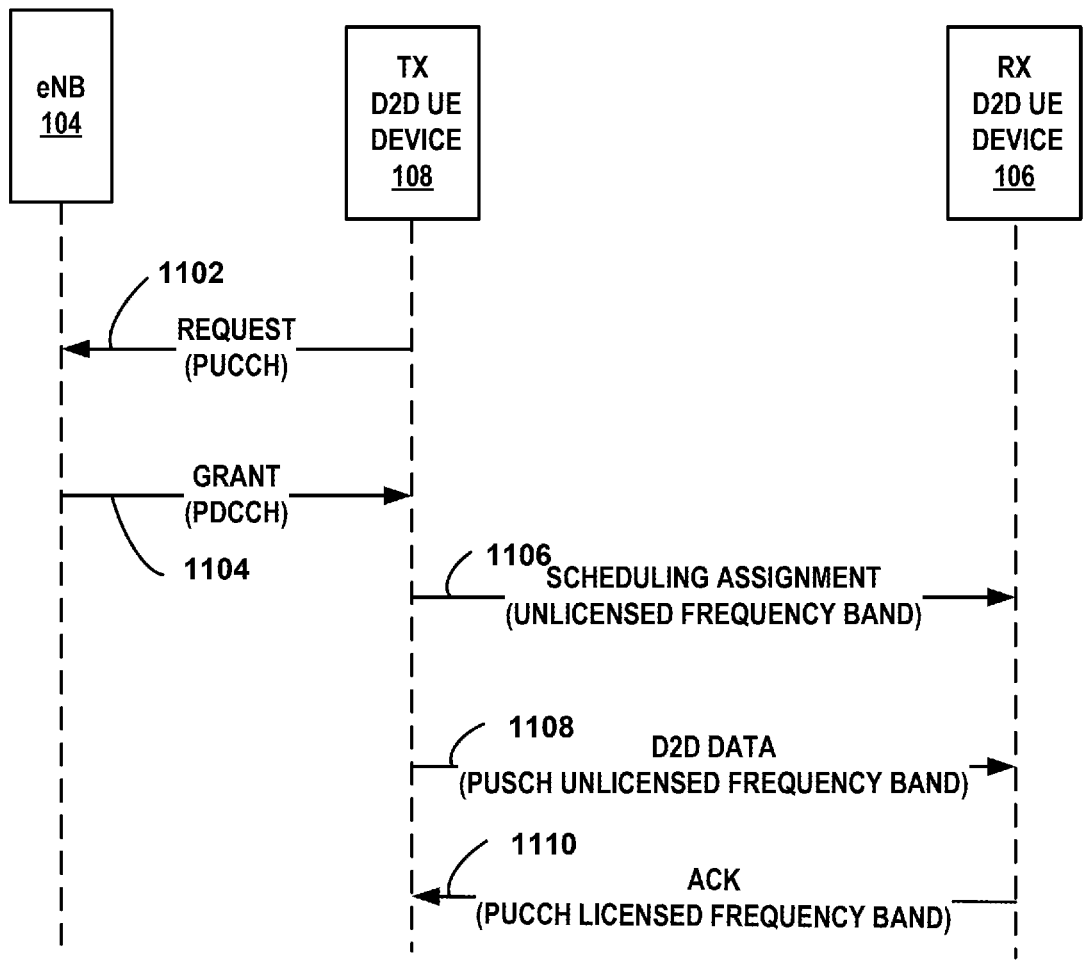
FIG. 11A is a message diagram for an example of D2D communication over the unlicensed frequency band where the D2D communication resource information is received by a transmitting D2D UE device from the eNB and conveyed to the transmitting D2D UE device in the unlicensed frequency band.

The eNB also transmits the scheduling assignment 702 to convey the information 1002 to the receiving D2D UE device 106. As discussed above, the scheduling assignment 702 provides the scheduling assignment information that at least identifies communication resources 706 that are assigned for D2D data 708 transmission from the transmitting UE device. As discussed above, all communication resources of the scheduling assignment region are used to ensure that other devices in the area will detect the transmission. The transmitting D2D UE device 108 receives the D2D communication resource information 1002 and, based on the information 1002, transmits the D2D data 708 to the receiving D2D UE device 106. Since the scheduling assignment region transmission is immediately prior to the data transmission 708, the transmitting UE device 108 does not monitor the unlicensed frequency band. The eNB, however, monitors the band prior to transmission of the scheduling assignments FIG. 11A is a message diagram 1100 for an example of D2D communication over the unlicensed frequency band where the D2D communication resource information 1002 is received by a transmitting D2D UE device from the eNB and a scheduling assignment conveys scheduling assignment information reflective of the D2D communication resource information to the receiving D2D UE device 106. The scheduling assignment is transmitted in the unlicensed frequency band by the transmitting UE device 108. Accordingly, FIG. 11A is a message example of the example discussed with reference to FIG. 10A.

At event 1102, the transmitting D2D UE device 108 sends a request for D2D communication resources to the eNB. For the example, the request is transmitted over the licensed frequency band in a physical uplink control channel (PUCCH). In response to the request, the eNB transmits a grant 1104 which includes the D2D communication resource information 1002 to the transmitting D2D UE device 108. For the example, the grant is transmitted over the PDCCH in the licensed frequency band 404. As discussed above, however, the information 1002 can be provided using other techniques.

At event 1106, the transmitting D2D UE device 108 sends a scheduling assignment 702 to the receiving D2D UE device 106 over the unlicensed frequency band. The scheduling assignment 702 is transmitted within the scheduling assignment region 704 and includes communication resource information identifying the resource elements in the unlicensed frequency band where D2D data will be transmitted. As discussed above, the location of the scheduling assignment 702 within the scheduling assignment region 704 may identify the D2D communication resources in some circumstances.

At event 1108, the D2D data is transmitted from the transmitting D2D UE device 108 to the receiving D2D UE device 106 using the resources in the unlicensed frequency band identified by the scheduling assignment 702. For the example, the communication resources are transmitted in the PUSCH of the physical channel structure in the unlicensed frequency band.

At event 1110, the receiving D2D UE device 106 responds to the PUSCH data message with an acknowledgment in the PUCCH within the licensed uplink physical channel structure in the licensed frequency band. In some situations, the acknowledgment is omitted.

Figure 11B:
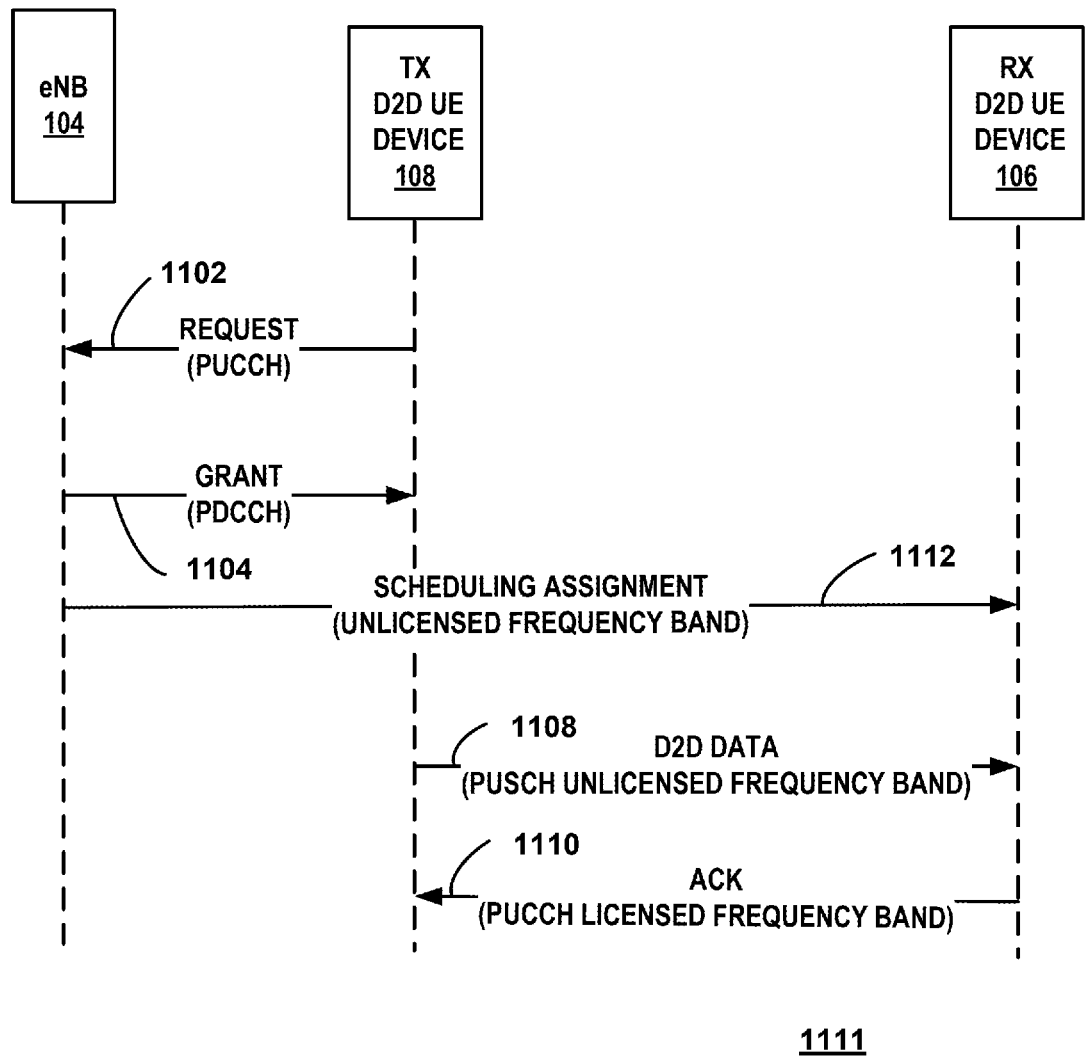
FIG. 11B is a message diagram for an example of D2D communication over the unlicensed frequency band where the D2D communication resource information is received by a transmitting D2D UE device from the eNB and the scheduling assignment is transmitted to the receiving D2D UE device by the eNB.

FIG. 11B is a message diagram 1111 for an example of D2D communication over the unlicensed frequency band where the D2D communication resource information 1002 is received by a transmitting D2D UE device from the eNB and the scheduling assignment is transmitted to the receiving D2D UE device 106 over the unlicensed frequency band by the eNB. Accordingly, FIG. 11B is a message example of the example discussed with reference to FIG. 10B.

At event 1102, the transmitting D2D UE device 108 sends a request for D2D communication resources to the eNB. For the example, the request is transmitted over the licensed frequency band in a physical uplink control channel (PUCCH). In response to the request, the eNB transmits a grant 1104 which includes the D2D communication resource information 1002 to the transmitting D2D UE device 108. For the example, the grant is transmitted over the PDCCH in the licensed frequency band 404. As discussed above, however, the information 1002 can be provided using other techniques.

At event 1112, the eNB sends a scheduling assignment 702 to the receiving D2D UE device 106 over the unlicensed frequency band. The scheduling assignment 702 is transmitted within the scheduling assignment region 704 and includes communication resource information identifying the resource elements in the unlicensed frequency band where D2D data will be transmitted. As discussed above, the location of the scheduling assignment 702 within the scheduling assignment region 704 may identify the D2D communication resources in some circumstances.

At event 1108, the D2D data is transmitted from the transmitting D2D UE device 108 to the receiving D2D UE device 106 using the resources in the unlicensed frequency band identified by the scheduling assignment 702. For the example, the communication resources are transmitted in the PUSCH of the physical channel structure in the unlicensed frequency band.

At event 1110, the receiving D2D UE device 106 responds to the PUSCH data message with an acknowledgment in the PUCCH within the licensed uplink physical channel structure in the licensed frequency band. In some situations, the acknowledgment is omitted.

Figure 12:
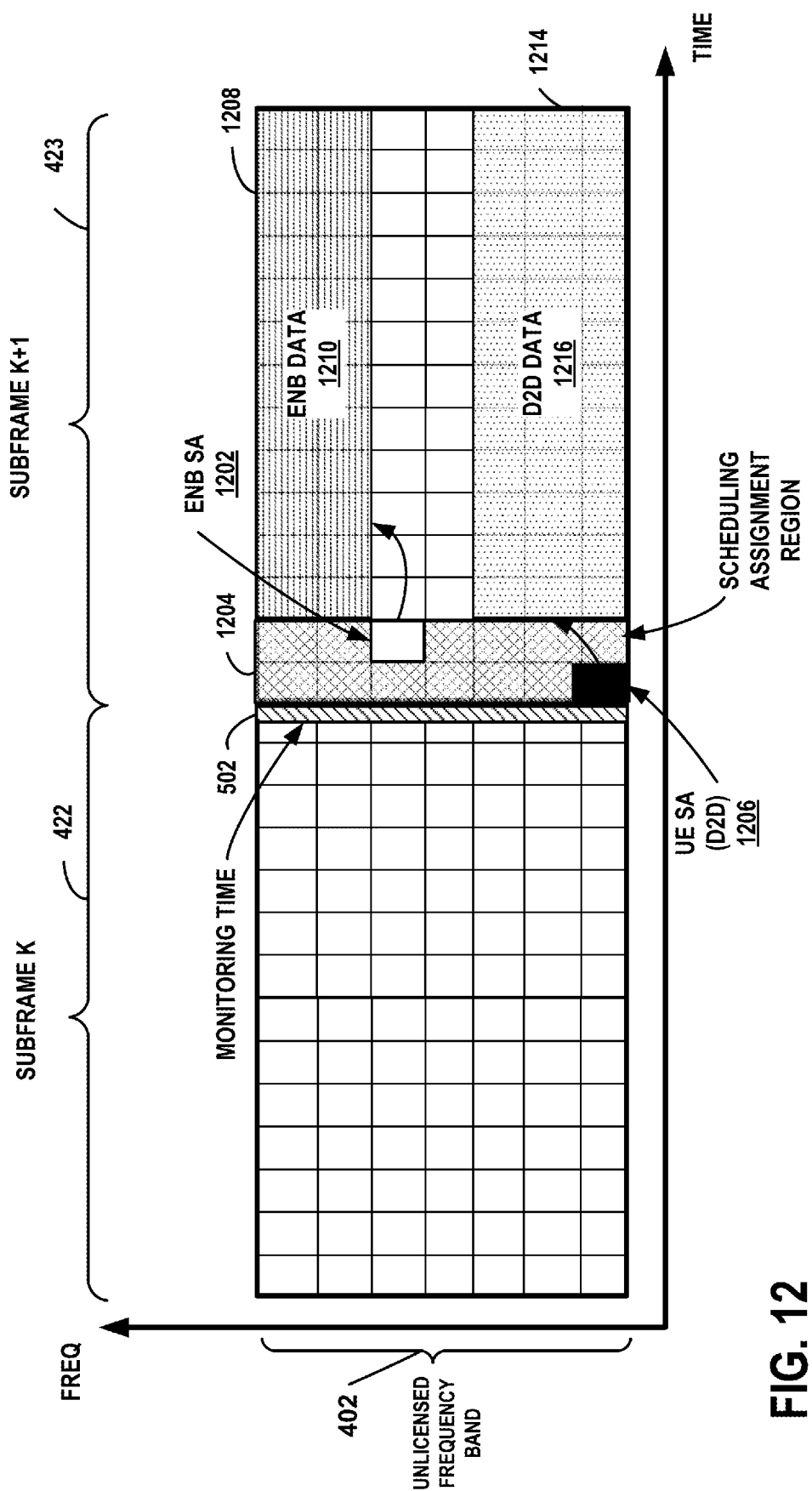
FIG. 12 is a graphical illustration of an example where an eNB transmits scheduling assignment within a scheduling assignment region and a transmitting D2D UE device transmits a D2D scheduling assignment within the same scheduling assignment region in the unlicensed frequency band.

FIG. 12 is a graphical illustration of an example where an eNB transmits scheduling assignment 1202 within a scheduling assignment region 1204 and a transmitting D2D UE device transmits a D2D scheduling assignment 1206 within the same scheduling assignment region 1204 in the unlicensed frequency band 402.

The eNB scheduling assignment identifies communication resources 1208 within the unlicensed frequency band that will be used for transmitting eNB data 1210 from the eNB to the UE device. The eNB scheduling assignment 1202 is transmitted within a scheduling assignment region 1204 of a subframe in the unlicensed frequency band 402. The UE scheduling assignment 1206 identifies communication resources 1214 within the unlicensed frequency band that will be used for transmitting D2D data 1216 from the transmitting UE device to the receiving UE device. The UE scheduling assignment 1206 is transmitted within the same scheduling assignment region 1204 in the unlicensed frequency band 402 as used for the eNB scheduling assignment 1202.

Both the eNB and the UE device monitor the unlicensed frequency band before transmitting the respective scheduling assignment. If the unlicensed frequency band is determined not to be in use, the eNB and the UE device transmit the scheduling assignments 1202, 1206. The monitoring time 502 may be performed in a prior subframe 422 or in the same frame 423 as the scheduling assignment region.

The scheduling assignment 1202, therefore, provides communication resource information that at least identifies communication resources 1208 that are assigned for downlink data 1210 transmission from the eNB to the transmitting UE device. The scheduling assignment 1206 provides communication resource information that at least identifies communication resources 1214 that are assigned for D2D data 1216 transmission from the transmitting UE device. In some situations, the scheduling assignments 1202, 1206 explicitly identify the communication resource information by including data that is indicative of the data communication resources 1208, 1214. In other situations, the scheduling assignments 1202, 1206 identify the communication resources by the location of the scheduling assignments within the scheduling assignment region 1204. In addition, the each scheduling assignments may identify a set of communication resources in a single subframe or multiple sets of resources in multiple subframes. In some situations, scheduling assignments for multiple UE devices may be transmitted within the same scheduling assignment region of the same subframe 1208.

Figure 13:
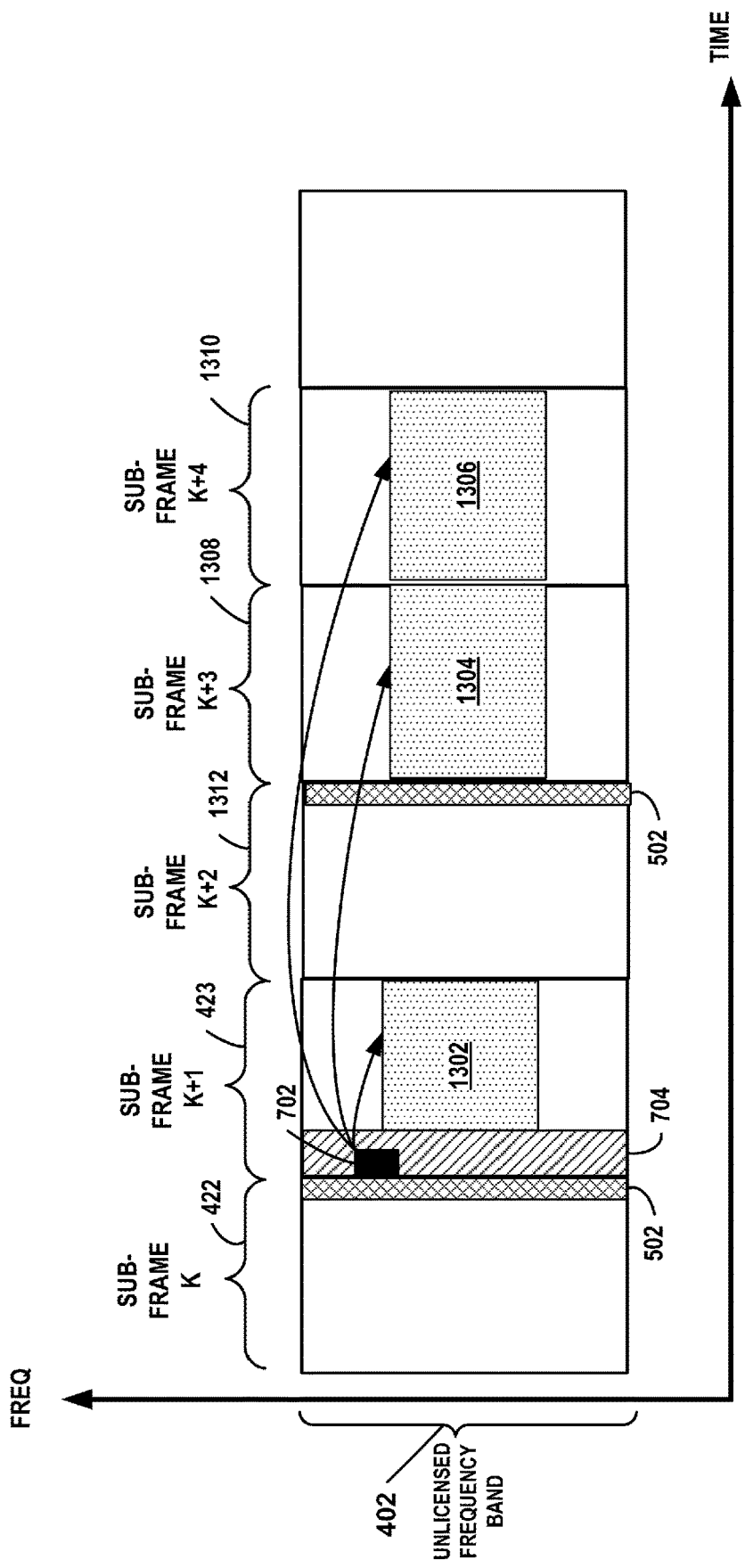
FIG. 13 is a graphical illustration of an example where the scheduling assignment transmitted within the scheduling assignment region in the unlicensed frequency band identifies communication resources within several subframes.

FIG. 13 is a graphical illustration of an example where the scheduling assignment 702 (1202) transmitted within the scheduling assignment region 704 in the unlicensed frequency band 402 identifies communication resources within several subframes. For the example of FIG. 13, the scheduling assignment conveys communication resource information that identifies communication resources 1302, 1304, 1306 in the subframe K+1 423, subframe K+3 1308 and subframe K+4 1310. Therefore, the scheduling assignment 702 identifies communication resources (resource elements) 1302 in the subframe K+1 423 which is the same subframe used to transmit the scheduling assignment 702. In addition, the scheduling assignment 702 identifies communication resources (resource elements) 1304 in the subframe K+3 1308 and communication resources (resource elements) 1306 in the subframe K+4 1310. The example of FIG. 13 also shows that the monitoring period 502 may be omitted prior to some transmissions in some situations. The unlicensed frequency band is monitored prior in the subframe K 422, prior to transmission in the subframe K+1 423 and in the subframe K+2 1312 prior to the subframe K+3 1308. However, the unlicensed frequency band is not monitored immediately prior to transmission in subframe K+4 1310. The monitoring is not necessary in some situations where there is transmission in the prior subframe. Other devices sensing the unlicensed frequency band will detect the prior transmission (e.g., transmission in resources 1304) and will not transmit signals until the sensing reveals that the band is no longer in use.

Figure 14:
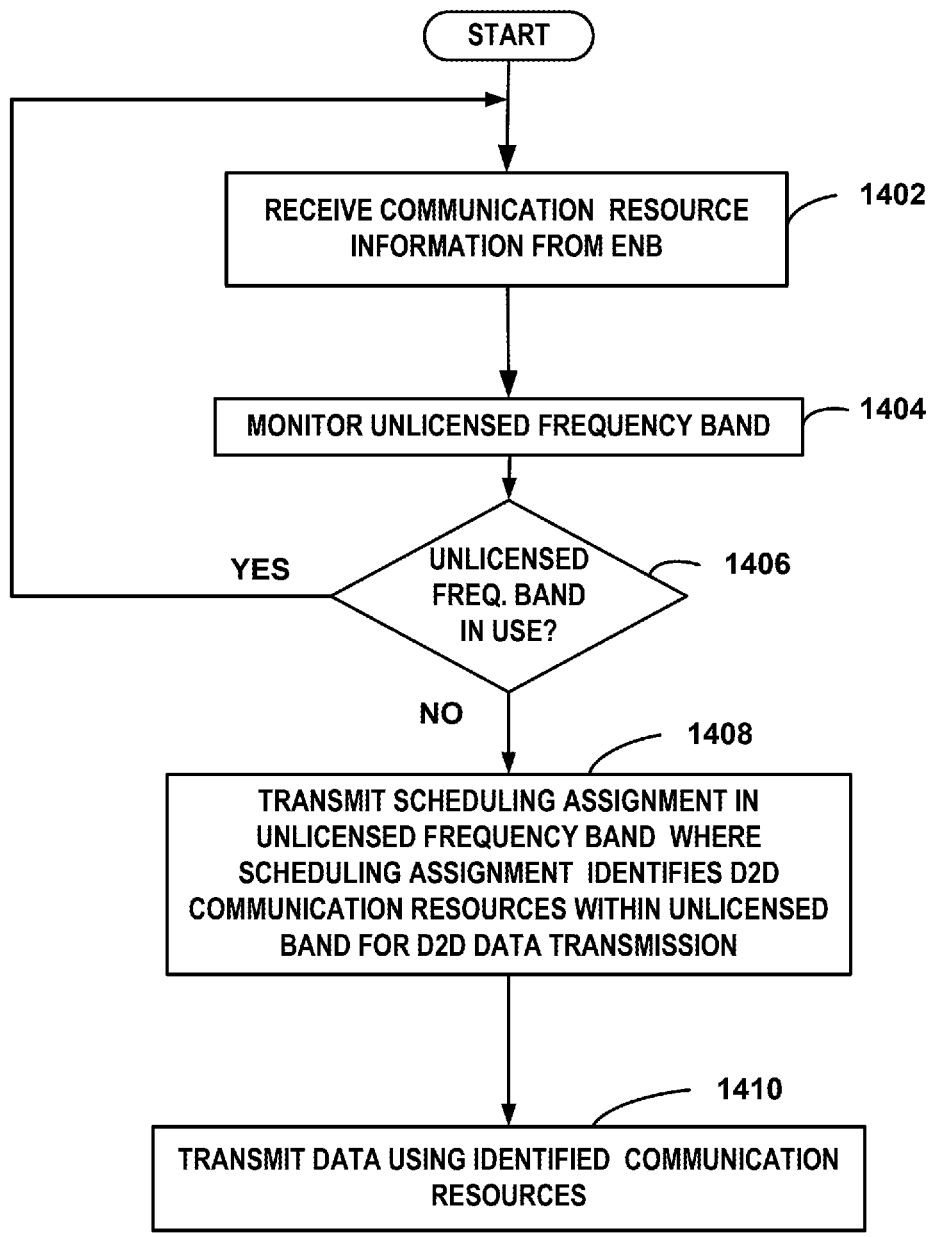
FIG. 14 is a flow chart of a method performed at a transmitting D2D UE device for the example where the transmitting D2D UE device monitors the unlicensed frequency band, transmits a scheduling assignment, and transmits data within the unlicensed frequency band.

FIG. 14 is a flow chart of a method performed at a transmitting D2D UE device for the example where the transmitting D2D UE device monitors the unlicensed frequency band, transmits a scheduling assignment, and transmits data within the unlicensed frequency band.

At step 1402, the transmitting D2D UE device receives communication resource information from the eNB. The communication resource information at least identifies time-frequency resources allocated to D2D communication. In some circumstances, the communication resource information identifies specific time-frequency communication resources for communication by the transmitting D2D UE device. In other situations, the communication resource information identifies a pool or set of resources that can be used by the D2D UE devices. As discussed above, the communication resource information can be sent via dedicated control signaling or can be broadcast. Also, the communication resource information can be transmitted over the unlicensed frequency band or the licensed frequency band.

At step 1404, the transmitting D2D UE device monitors the unlicensed frequency band. As discussed above, techniques similar to those used by the unlicensed equipment can be used to monitor (sense) the unlicensed frequency band.

At step 1406, the transmitting D2D UE device determines whether the unlicensed frequency band is in use. Measurements obtained by the monitoring can be compared to a threshold, for example. If the unlicensed frequency band is in use, the transmitting D2D UE device method returns to step 1402 to obtain new communication resource information and, subsequently, monitor the unlicensed frequency band. In some circumstances, the transmitting D2D UE device can return to step 1404 to continue monitoring the unlicensed frequency band without obtaining new communication resource information. If the unlicensed frequency band is not in use, the procedure continues at step 1408.

At step 1408, the transmitting D2D UE device transmits a scheduling assignment to the receiving D2D UE device. For the example, the scheduling assignment is transmitted within the scheduling assignment region of a physical channel structure that is similar to the physical channel structure used by the D2D UE devices in the licensed frequency band. The scheduling assignment identifies D2D communication resources (time-frequency resources) in the unlicensed frequency band that will be used to transmit D2D data from the transmitting D2D UE device to the receiving D2D UE device. In some situations, the communication resource information received from the eNB is the same information conveyed in the scheduling assignment. In other situations, the transmitting D2D UE device selects resources from the communication resource information provided by the eNB and identifies the selected resources with the scheduling assignment.

At step 1410, the transmitting D2D UE device transmits the D2D data to the receiving D2D UE device in the unlicensed frequency band 402. For the example of FIG. 14 transmitting D2D UE device transmits the scheduling assignment and the D2D data in the same subframe in the unlicensed frequency band.

As discussed above, in some situations, the eNB may use the same scheduling assignment region to transmit the eNB scheduling assignment to the receiving D2D UE device and/or eNB scheduling assignments to other UE devices. Accordingly, in some situations the scheduling assignment region is shared between devices.

Figure 15:
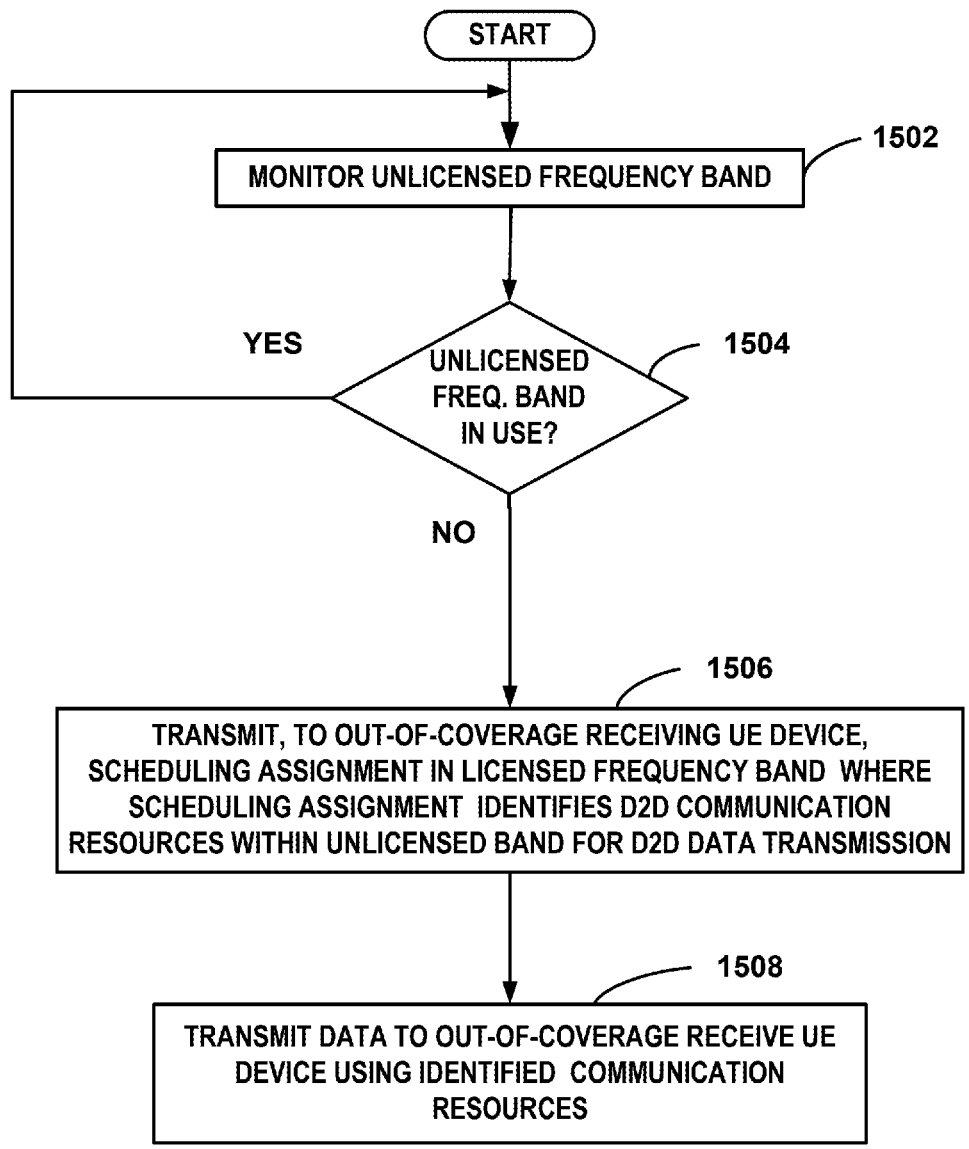
FIG. 15 is a flow chart of a method performed at a transmitting D2D UE device for the example where the transmitting D2D UE device and the receiving D2D UE device are out-of-coverage and the transmitting D2D UE device transmits a scheduling assignment in the licensed frequency band and transmits D2D data within the unlicensed frequency band.

FIG. 15 is a flow chart of a method performed at a transmitting D2D UE device for the example where the transmitting D2D UE device and the receiving D2D UE device are out-of-coverage and the transmitting D2D UE device transmits a scheduling assignment in the licensed frequency band and transmits D2D data within the unlicensed frequency band.

At step 1502, the transmitting D2D UE device monitors the unlicensed frequency band. As discussed above, techniques similar to those used by the unlicensed equipment can be used to monitor (sense) the unlicensed frequency band.

At step 1504, the transmitting D2D UE device determines whether the unlicensed frequency band is in use. Measurements obtained by the monitoring can be compared to a threshold, for example. If the unlicensed frequency band is in use, the transmitting D2D UE device method returns to step 1502 to continue monitoring the unlicensed frequency band. If the unlicensed frequency band is not in use, the procedure continues at step 1506.

At step 1506, the transmitting D2D UE device transmits a scheduling assignment to the receiving D2D UE device. For the example, the scheduling assignment is transmitted within the scheduling assignment region of a physical channel structure in the licensed frequency band. The scheduling assignment identifies D2D communication resources (time-frequency resources) in the unlicensed frequency band that will be used to transmit D2D data from the transmitting D2D UE device to the receiving D2D UE device.

At step 1508, the transmitting D2D UE device transmits the D2D data to the receiving D2D UE device in the unlicensed frequency band 402. For the example of FIG. 15, the transmitting D2D UE device transmits the scheduling assignment and the D2D data in the different subframes. In some situations, however, the scheduling assignment and the data may be transmitted in the same subframe but in different frequency bands.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method comprising:
    transmitting, from a transmitting user equipment (UE) device, scheduling assignment information within a scheduling assignment region of a physical channel structure, the physical channel structure defined by at least one revision of a communication specification governing communication within at least a licensed frequency band, the scheduling assignment information identifying time-frequency communication resources of an unlicensed frequency band;
    transmitting data, using the time-frequency communication resources of the unlicensed frequency band, from the transmitting UE device to a receiving UE device.

2. The method of claim 1, wherein the transmitting the scheduling assignment information comprises transmitting the scheduling assignment information within the unlicensed frequency band.

3. The method of claim 2, further comprising:
    monitoring the unlicensed frequency band;
    determining, at least partially based on the monitoring, whether the unlicensed frequency band is in use; and
    transmitting, the scheduling assignment within the unlicensed frequency band only if the unlicensed frequency band is determined to not be in use.

4. The method of claim 1, further comprising:
    receiving, from an enhanced Node B (eNB), communication resource information identifying the time-frequency communication resources of the unlicensed frequency band.

5. The method of claim 4, wherein the communication resource information identifies a set of resources including the time-frequency communication resources of the unlicensed frequency band, the method further comprising:
    selecting the time-frequency communication resources to generate the scheduling assignment information.

6. The method of claim 4, wherein the communication resource information is received over a dedicated control channel within the licensed frequency band.

7. The method of claim 4, wherein the communication resource information is received over a broadcast control channel within the licensed frequency band.

8. The method of claim 4, wherein the communication resource information is received over a broadcast control channel within the unlicensed frequency band.

9. The method of claim 1, wherein transmitting the scheduling assignment information comprises transmitting the scheduling assignment information while the transmitting UE device and the receiving UE device are outside of all eNB service areas.

10. The method of claim 9, wherein transmitting the scheduling assignment information comprises transmitting the scheduling assignment information in an uplink channel of the licensed frequency band.

11. The method of claim 2, wherein the scheduling assignment region comprises an eNB scheduling assignment.

12. The method of claim 1, wherein the physical channel structure is in accordance with a revision of The Third-Generation Partnership Project Long-Term Evolution (3GPP LTE) communication specification.

13. A transmitting user equipment (UE) device comprising:
    a transmitter configured to transmit scheduling assignment information within a scheduling assignment region of a physical channel structure, the physical channel structure defined by at least one revision of a communication specification governing communication within at least a licensed frequency band, the scheduling assignment information identifying time-frequency communication resources of an unlicensed frequency band, the transmitter configured to transmit data, using the time-frequency communication resources of the unlicensed frequency band, to a receiving UE device.

14. The transmitting UE device of claim 13, wherein the transmitter transmits the scheduling assignment information within the unlicensed frequency band.

15. The transmitting UE device of claim 14, further comprising:
    an unlicensed band receiver configured to monitor the unlicensed frequency band; and
    a controller configured to determine, at least partially based on the monitoring by the receiver, whether the unlicensed frequency band is in use, the transmitter transmitting the scheduling assignment within the unlicensed frequency band only if the unlicensed frequency band is determined to not be in use.

16. The transmitting UE device of claim 15, further comprising:
   a licensed band receiver configured to receive, from an eNodeB (eNB), communication resource information identifying the time-frequency communication resources of the unlicensed frequency band.

17. The transmitting UE device of claim 15, wherein the communication resource information identifies a set of resources including the time-frequency communication resources of the unlicensed frequency band, the controller further configured to select the time-frequency communication resources to generate the scheduling assignment information.

18. The transmitting UE device of claim 15, wherein the communication resource information is received over a dedicated control channel within the licensed frequency band.

19. The transmitting UE device of claim 15, wherein the communication resource information is received over a broadcast control channel within the licensed frequency band.

20. The transmitting UE device of claim 15, wherein the communication resource information is received over a broadcast control channel within the unlicensed frequency band.

* * * * *